United States Patent [19]
Watkins et al.

[11] Patent Number: 5,361,386
[45] Date of Patent: Nov. 1, 1994

[54] SYSTEM FOR POLYGON INTERPOLATION USING INSTANTANEOUS VALUES IN A VARIABLE

[75] Inventors: Gary S. Watkins; Russell A. Brown, both of Salt Lake City, Utah

[73] Assignee: Evans & Sutherland Computer Corp., Salt Lake City, Utah

[21] Appl. No.: 108,942

[22] Filed: Aug. 17, 1993

Related U.S. Application Data

[63] Continuation of Ser. No. 758,992, Sep. 10, 1991, abandoned, which is a continuation-in-part of Ser. No. 506,749, Apr. 10, 1990, abandoned, which is a continuation-in-part of Ser. No. 129,036, Dec. 4, 1987, abandoned.

[51] Int. Cl.⁵ .......................................... G06F 15/00
[52] U.S. Cl. .................................................. 395/130
[58] Field of Search ............. 395/129, 130, 126, 127, 395/191; 345/136, 137, 132, 133

[56] References Cited
U.S. PATENT DOCUMENTS
4,821,212 4/1989 Heartz ............................. 395/126

*Primary Examiner*—Phu K. Nguyen

[57] ABSTRACT

Barycentric coordinates are determined using data readily available in computer graphics systems and defining polygons in world space so as to interpolate such polygons with regard to pixels selected by scan conversion. The barycentric coordinates are employed to interpolate the polygons, for example to accomplish smooth shading or texture mapping. The process of the system involves defining primitive data (e.g. polygons) in a space not subject to nonlinear distortion (e.g. world space), transforming select primitive data to a space that is subject to nonlinear distortion, calculating in the space subject to nonlinear distortion (e.g. screen space) a set of areas (e.g. pixels) within a defined primitive (e.g. polygon) using data transformed to space subject to nonlinear distortion, transforming the set of areas to the space not subject to nonlinear distortion, determining at least one differential value (rate of change) of a variable for the primitive, calculating display data that is not subject to nonlinear distortion and using the differential to provide display data. For example, at a pixel, the rate of change in coordinate value (differential) is determined and utilized in texture mapping to facilitate the selection of levels of fuzziness with regard to picture detail for the pixel. Specifically, the differentials are in the coordinates of the texture du l and dv.

52 Claims, 6 Drawing Sheets

SYSTEM FOR POLYGON INTERPOLATION USING INSTANTANEOUS VALUES IN A VARIABLE

RELATED SUBJECT MATTER

This application is a continuation of application Ser. No. 07/758,992, filed Sep. 10, 1991, entitled "SYSTEM FOR POLYGON INTERPOLATION USING INSTANTANEOUS VALUES IN A VARIABLE," now abandoned, which is a continuation-in-part of application Ser. No. 07/506,749, filed Apr. 10, 1990, entitled "SYSTEM FOR USING BARYCENTRIC COORDINATES AS FOR POLYGON INTERPOLATION," now abandoned, which is a continuation-in-part of application Ser. No. 07/129,036, filed Dec. 4, 1987, entitled "SYSTEM FOR USING BARYCENTRIC COORDINATES AS FOR POLYGON INTERPOLATION," now abandoned.

BACKGROUND AND SUMMARY OF THE INVENTION

At present, perhaps video games are the most commonly known form of computer graphics apparatus. However, the field embraces many other forms of apparatus, as for use in training, design, modeling and so on. Typically, such apparatus give the viewer the impression of looking through a window at a picture somewhat like that of a television receiver. To generate the picture, the computer graphics system selects content from basic forms (primitives) orients the selected-pieces with respect to the window and displays them on a viewing screen as a composite.

According to one technique, picture content is developed from primitives as polygons, i.e. closed outlines bounded by straight edges. Such polygons define outlines of solid areas of gray or color and are joined to form an object or a part of an object in the desired display. Usually, the polygons are mathematically defined in three-dimensional, world space. Conventional basic practice involves orienting such polygons with respect to a viewpoint, scanning the polygons to define data for small, individual picture areas or elements (pixels), eliminating hidden surface representations, then displaying the pixels in a perspective array on a two-dimensional screen. Essentially, the scan conversion of a polygon involves finding all the pixels that lie inside each polygon and accordingly setting the color and intensity contribution for each pixel. In a typical display, a million pixels may compose a picture.

In accordance with prior computer graphics techniques, the picture image is stored as a pattern of binary digital numbers that represent individual pixels in a rectangular array. The numerical data representative of individual pixels is supplied in sequence to a cathode ray tube apparatus-as the tube screen is scanned to display the pixels in the rectangular array. Accordingly, the pixels are presented in a raster pattern as a succession of scan lines, each of which consists of a row of pixels. The raster pattern is most familiar in television displays.

As mentioned above, computer graphics systems are capable of providing realistic images from primitives which may take the form of planar polygons. The generation of such images also involves subdividing polygons and selecting the portions of such polygons that are unobstructed to the viewer and accordingly appear in the display. In that regard, several hidden surface techniques are well known. In summary, the present state of the art in computer graphics allows the generation of dynamic realistic images by processors utilizing the techniques described above.

When geometric primitives other than planar polygons are used for model definition, the primitives often are decomposed into planar polygons, which thereafter may be further decomposed into triangular polygons for processing, as to provide better simulation or remove hidden surfaces. For example, a curved or parametric surface of a display object may be decomposed by subdivision as well known in the prior art and as treated in U.S. Pat. No. 4,646,251, issued Feb. 24, 1987, to Hayes, Brown, Jensen and Madsen.

While defining planar polygons to compose a picture is effective, the technique still provides an unrealistic picture. For example, it is desirable that the image of a cylinder appear as a cylinder, not as an array of discrete planar polygons joined together to approximate a cylinder. However, such shapes attain greater realism if they are smooth shaded over the surface of several polygons. The technique is illustrated and described in a book entitled, *Principles of Interactive Computer Graphics*, Second edition, Newman & Sproull, McGraw-Hill Book Company, 1979. Various specific shading techniques are well known in the art, and in that regard the referenced book describes both Gouraud and Phong shading techniques.

The Gouraud technique of smooth shading involves computing normals at the vertices (corners) of each polygon then computing the precise shade at each of the vertices. An interpolation is then performed to determine the shade for each pixel dissecting the polygon. Traditionally, the interpolation is performed on each polygon as it exists in perspective or screen space. That is, shading is performed after polygons have been transformed from world space to screen space. In that regard, see Chapter 22 of the referenced book, *Principles of Interactive Computer Graphics*, at page 339, a section captioned "Transformations in Viewing". A similar situation exists with respect to interpolation of polygons for Phong shading.

In addition to shading, another property of surfaces is their texture. Essentially, while surfaces modeled by polygons are smooth, realism can be enhanced by providing texture. Also, color patterns may be provided as a further element of texture. With regard to texture, see the book entitled, *Principles of Interactive Computer Graphics*, as referenced above, a section beginning on page 407. In a related regard, non-uniform texture mapping is well known in the art as treated in an article entitled, "Survey of Texture Mapping" by Paul S. Heckbert, published in *IEEE Computer Graphics and Applications*, November 1986, pp. 56–67.

Recapitulating to some extent, planar polygons (transformed to perspective or screen space) traditionally have been interpolated for shading or texturing. However, the transformation of polygons from world space to screen space involves a nonlinear projection. As a consequence, interpolating a polygon (for shading or texturing) after transformation to screen space is quite different from interpolating the same polygon in world space. Specifically, interpolations in screen space are subject to nonlinear distortion.

Although, traditionally, polygons have been interpolated in screen space, such interpolation is erroneous and deters from the displayed image. In that regard, the present invention is based on a recognition that considerably improved displays result from the interpolation, for example in world space, that is, in space that is not subject to nonlinear distortion. This improvement also may be obtained through interpolation of polygons in spaces other than world space which are not subject to the nonlinear distortion of screen space. An example of another space not subject to nonlinear distortion is eye space. However, in the past, the data for such interpolation in spaces such as world space or eye space was not considered to be economically feasible for use.

Considering another aspect of computer graphics, it has been proposed to better simulate the perspective of actual vision by altering the level of detail shown as an object moves away from the view point. For example, while the texture or pattern on a nearby object may be clear and crisp, the texture on a remote object appears fuzzy and ultimately merges to a uniform color. To accommodate the phenomena, it has been proposed to vary the texture on an object as the range changes. One such technique is disclosed in a paper entitled, "Pyramidal Parametrics" by Lance Williams, published July 1983 in *Computer Graphics*, Volume 17, No. 3. The article has been identified by the Association for Computing Machinery as ACM 0-89791-109-1/83/007/0001.

Generally, although various texture mapping techniques have improved computer graphic images, prior techniques along with antialiasing of the texture involve troublesome and voluminous computations. For example, substantial computation has been required to determine a parameter for use in selecting an appropriate scale of fuzziness based on object proximity.

Summarizing to some extent, the system of the present invention is based on recognizing the need for an ability to calculate in a coordinate space that is not subject to nonlinear distortion with respect to primitives defined by screen space. For example, the system of the present invention interpolates using areas in space not subject to nonlinear distortion, where those areas are defined in screen space. The system next determines differentials (rates of change) in space not subject to nonlinear distortion, as for texture mapping. The differentials are variously used to facilitate the generation of a picture, for example to texture a polygon.

The system of the present invention may be embodied as an effective process or product using parameters in a coordinate space that is not subject to nonlinear distortion and differentials for calculations, as to interpolate planar polygons, and accomplish smooth shading or texturing for an object defined by the polygons. Interpolation in accordance with the present invention is performed on planar polygons defined in space not subject to nonlinear distortion and thus enables improved displays. That is, the present system develops data from screen space to world space for interpolations.

For example, the system of the present invention facilitates world-space calculations involving differentials by utilizing data in unconventional combinations. Readily available vectors, susceptible to manipulation as dot products and cross products, accomplish the interpolation of a polygon in world space and may be used to effectively shade or texture objects composed of such polygons using differentials.

To further consider a specific example, the system of the present invention may be implemented to texture a primitive polygon in a graphic image. Parameters for the image are selected including parameters defining screen space. With respect to the polygon, areas, specified as pixels, are defined in screen space then related to world space. Texture data is specified or defined in world space along with the polygon. Utilizing a differential of at least one variable, e.g. texture coordinate values (du, dv) an interpolation is performed with respect to the area in world space to provide display data. Thus, values indicating differentials may be in relation to texture coordinates (u and v) for selection of a texture scale. Various other picture computations also may be facilitated by the utilization of differentials.

BRIEF DESCRIPTION OF THE DRAWINGS

In the drawings, which constitute a part of this specification, exemplary embodiments exhibiting various objectives and features hereof are set forth, specifically.

DESCRIPTION OF THE ILLUSTRATIVE EMBODIMENT

A detailed illustrative embodiment of the present invention is disclosed herein; however, it is merely representative, recognizing that a wide variety of specific embodiments of the disclosed system are possible. Nevertheless, the illustrative embodiment is deemed to afford the best embodiment for purposes of disclosure and to provide a basis for the claims herein which define the scope of the present invention.

Initially, consideration of some graphic representations will be helpful as related to the present development. Initially, considerations are with regard to the decomposition of conics into planar polygons. Graphics space coordinates are treated. Then range variations are considered along with texturing and antialiasing.

Figure 1:
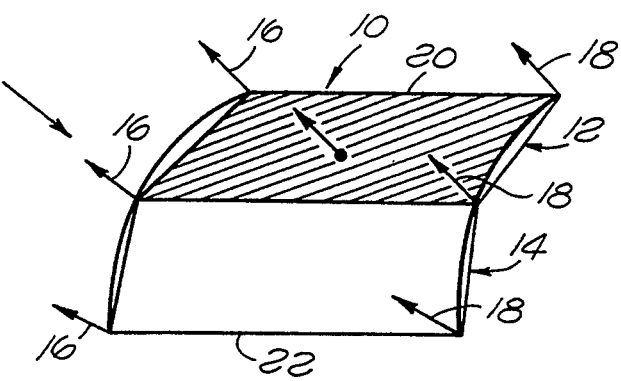
FIG. 1 is a graphic representation of a curved surface illustrated with respect to polygon decomposition and vertex normalization as for texturing in accordance herewith.

Referring to FIG. 1, an external curved surface comprising a fragment 10 of a cylinder is illustrated in heavy lines. The cylindrical fragment 10 is crudely simulated by a pair of planar polygons 12 and 14 represented in light lines. To more closely simulate the shape of the cylinder fragment 10, an increased number of planar polygons could be used. However, for purposes of the present explanation, it can be seen that the two planar polygons 12 and 14 roughly simulate the cylindrical surface. Accordingly, some approximation is accomplished and the relatively large polygons 12 and 14 are convenient and useful for the following explanation.

Note that each of the polygons (as illustrated) has a uniform intensity or shade which approximates the shading for a half of the curved fragment 10. With lower frontal illumination of the surface, as illustrated, the polygon 12 is shaded darker than the polygon 14. Techniques of such shading are described in Chapter 25 of the above-referenced book, *Principles of Interactive Computer Graphics.*

While uniformly shading the individual polygons defining an object impacts some realism, such displays tend to have a patchwork appearance. For greater realism, it has been proposed to smoothly shade the polygons and apply texture over the entire surface of the simulated object. Techniques for accomplishing smooth shading are treated in the above-referenced book at Chapter 25 and may involve interpolating from the normals at the vertices of each polygon. Note that the surface normal vectors at the vertices of the polygons 12 and 14 are generally indicated by arrows 16 and 18. Also, the surface of the cylindrical fragment 10 coincides to the polygons 12 and 14 at the polygon vertices.

It may be desirable to interpolate quantities other than normal vectors for polygons. For example, a display surface might be covered with a texture. The process of applying patterns to surfaces is called "texture mapping" and is treated in the above-referenced book, *Principles of Interactive Computer Graphics*, in Chapter 25.

Texture mapping essentially involves locking texture to polygons and is performed by an interpolative process that is somewhat analogous to smooth shading. The mapping of texture or other images onto surfaces is more effective if the texture is rendered progressively more fuzzy as the polygon moves away from the viewer. Of course, the operation is in accordance with the perspective nature of observations by the human eye. For example, the squares of a checkerboard are vividly clear to the normal eye when viewed at a distance of ten feet. However, as the checkerboard is moved away from the eye, boundaries between individual squares of the board progressively become more fuzzy. At some point, perhaps a few hundred feet, the black and white squares of a board simply fade to a uniform color. Accordingly, effective texture mapping reflects changes in the texture as would appear to an observer with movement away from the object. Note that to avoid aliasing (sampling defects causing picture irregularities) these changes should occur smoothly.

Texture mapping involves interpolation of texture patterns that typically are two-dimensional quantities traditionally defined in a u,v coordinate system. In accordance with the present invention as disclosed in detail below, interpolation of polygons for texture mapping is improved by initially defining areas with respect to screen space. In accordance with such definition, polygon areas are interpolated in space that is not subject to nonlinear distortion. The interpolation involves the use of differentials (rates of change) in variables, e.g. u and v with regard to texturing. Specifically, interpolation or other calculations are performed utilizing the differential of a variable to accommodate an improved system. Further aspects related to the disclosed system are illustrated in FIG. 2 and will now be considered in detail.

Figure 2:
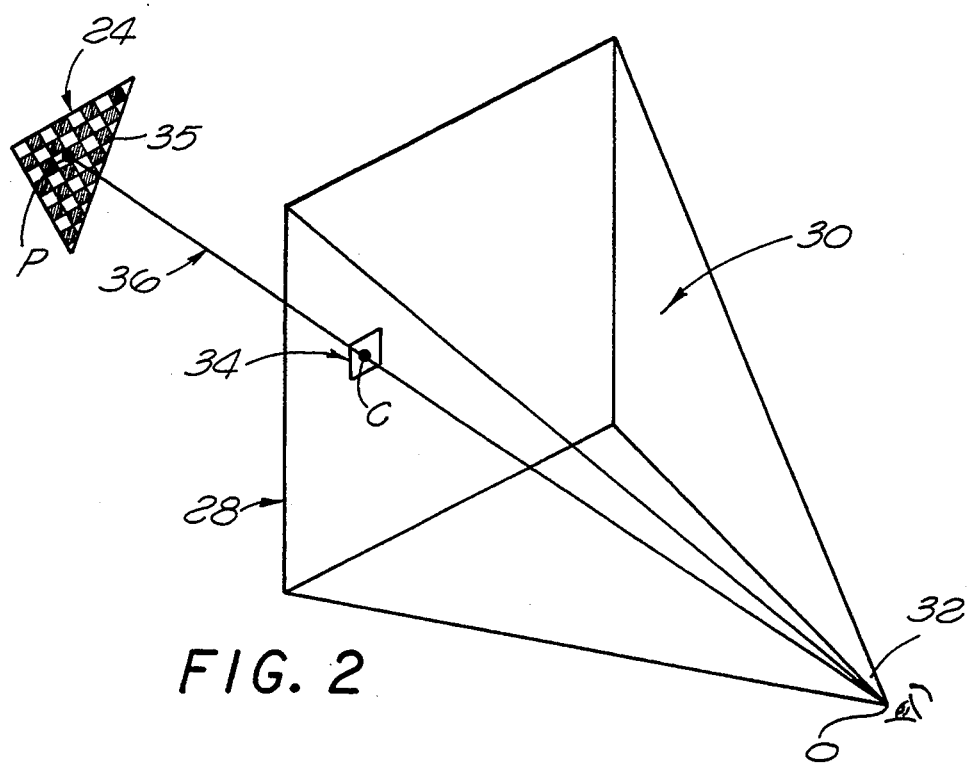
FIG. 2 is a graphic representation illustrating a view frustum radiating from an eyepoint with respect to screen space and world space as treated herein.

A textured polygon 24 in the form of a triangle is illustrated in world space (FIG. 2, upper left). Note that the various space designations as used in the field of computer graphics are treated in the referenced text, *Principles of Interactive Computer Graphics.*

In summary, world space or object space (three dimensional) serves to define objects prior to any geometric transformations. In eye space, objects are transformed so that the eye or viewpoint is the origin for coordinates and the view ray is along the z-axis. Screen space involves further transformations to account for the perspective foreshortening of the view pyramid and with clipping performed. Objects in screen space are mapped to a viewpoint, typically on a pixel grid. Generally, interpolations of polygons transformed to screen space introduce undesirable deviations.

In accordance with traditional techniques, the vertices of the polygon 24 are referenced to a point of origin (not shown) in world space. The world space origin also is established with reference to an eyepoint O (FIG. 2, lower right) as eye space. Using conventional methods, the polygon 24 readily may be referenced to the eyepoint O in terms of three-dimensional coordinates; see the referenced book, *Principles of Interactive Computer Graphics*, at page 339. Also, a discussion of world space and related transforms appears in Chapter 8 of a book, *Fundamentals of Interactive Computer Graphics* by Foley and Van Dam, published in 1984 by Addison-Wesley Publishing Company. See also a section of the book, *Interactive Computer Graphics* by Wolfgang K. Giloi, published in 1978 by Prentice-Hall, Inc., beginning at page 84 and treating space or domain transformations.

As generally explained above, to view the polygon 24 (exemplifying one of many components of an image) from the eyepoint O, areas of the polygon are defined in screen space at the screen 28; see the referenced book, *Principles of Interactive Computer Graphics*, at page 341.

In accordance with convention, the screen 28 comprises the base of a pyramidal view frustum 30 with an apex 32 at the eyepoint O. In a sense, the viewing screen 28 (at the base of the frustum 30) may be analogized to the screen of a television display through which world-space appearing objects (as the polygon 24) are viewed.

In accordance with well known traditional practice, the space of the screen 28 is dissected into small picture elements or pixels. For example, one million pixels may be organized in an array of one thousand rows, each of one thousand pixels. A representative pixel 34 (idealized and enlarged) is illustrated at a central location of the screen 28. Note that a ray 36 extends from the eyepoint O, passing through the center C of pixel 34, to the point P on the polygon 24.

The ray 36 exemplifies perhaps a million of such rays that dissect the scene or image of primitives into pixels. Each view ray 36 is defined by a pixel at the screen 28, then continues beyond the screen 28 (pixel intersection) and may intersect one or more polygons in world space comprising the primitives to form a picture. Pictures are composed by scan converting the pixels, as in a raster pattern.

At this juncture it is noteworthy that the location of the polygon intersection point P is not known in terms of coordinates. If the point P were defined in world space, the polygon could be interpolated; however, such is not the case. However, in accordance herewith available data has been recognized and is utilized in a practical form to perform the interpolation. Such interpolation enables considerably improved pictures.

As illustrated in FIG. 2, the polygon 24 bears a texture 35. In accordance herewith, the texture 35 is mapped on the polygon 24 utilizing interpolations based on differentials in variables expressed in the texture coordinates u and v. Thus, the ability to interpolate in world space, areas defined in screen space, utilizing differentials in a variable affords the capability to economically accomplish substantially improved computer graphics images.

Specific exemplary interpolations in world space are treated in detail below along with related explanatory calculations; however, at this point some further consideration of physical elements may be helpful. Specifically, for example, assume that the polygon 24 (FIG. 2) moves away from the viewpoint O. Displacement of the polygon 24 along the ray 36 (Z dimension) is the assumption.

Figure 3:
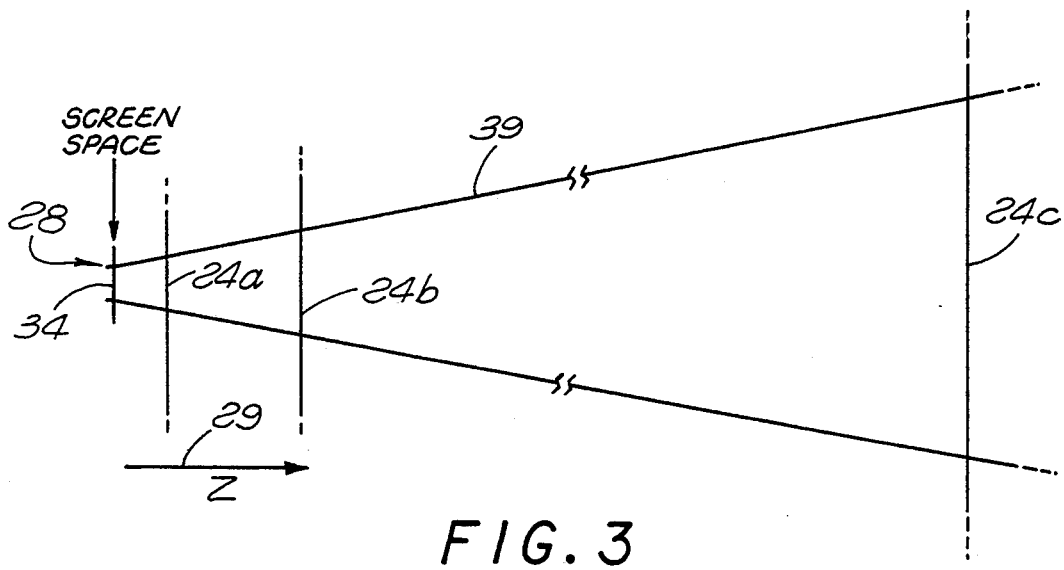
FIG. 3 is a plan view of a component pixel frustum illustrating a representation related to depth.

FIG. 3 shows the pixel 34 as a sectioned plane and illustrates the polygon 24 in a pixel frustum 39 at various relative depths, i.e. indicated as polygon areas 24a, 24b and 24c, each progressively more remote from the pixel 34. As the polygon 24 moves away from the pixel 34 (arrow 29) more of the texture 35 (FIG. 2) is contained and the texture becomes fuzzy. The phenomena is illustrated in FIG. 4 and will now be considered.

Figure 4:
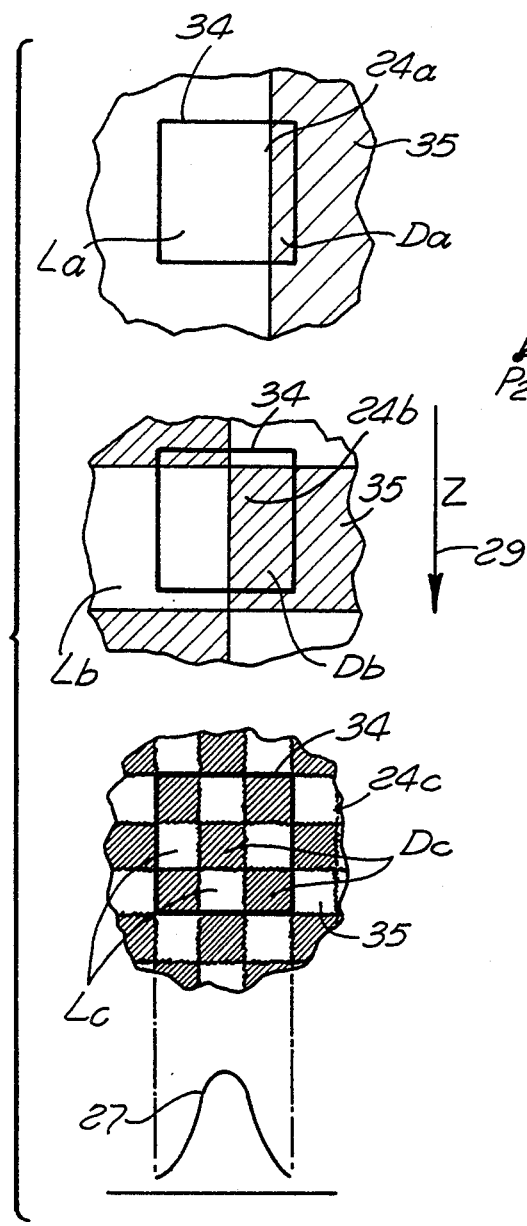
FIG. 4 is a graphic representation illustrating a pixel window content with respect to a textured polygon at varying depth dimensions.

FIG. 4 shows the areas of the polygon 24 (FIG. 2) contained by the pixel 34, as the polygon progressively moves away from the pixel 34 (also away from the eyepoint O) in the z dimension according to the arrow 29. With the polygon area 24a (FIGS. 3 and 4) positioned near the screen 28 (contiguous to the pixel 34) the pixel 34 is occupied primarily by a light area La and only slightly by a dark area Da. As represented, an area ratio of approximately four to one is illustrated. Accordingly, the shade of the pixel 34 would be represented with a weighted average of the areas La and Da, for example, as represented by the curve 27 indicated at the bottom of FIG. 4. Thus, a weighted average is computed in accordance with known techniques of the prior art to represent a gray scale for the pixel. As well known, the gray scale representation enhances the appearance of the graphics image and has an antialiasing effect. Note that although mention is made of a gray scale, for color images such antialiasing techniques are well known wherein the image components of red, blue and green are treated individually to obtain an ultimate pixel color and intensity.

Returning to a consideration of FIGS. 3 and 4, and the progressive depth displacement of the polygon 24, consider now the displacement of the polygon 24 as illustrated by the polygon area 24b. Accordingly, the pixel 34 defines the area 24b to embrace greater detail of the texture 35 as illustrated within the pixel 34 (FIG. 4). Of course, the change simply results from the fact that the polygon 34 is deeper in the pixel frustum 39. Accordingly, the frustum has a larger base at the polygon 24 to encompass a greater area of the texture 35.

Further displacement of the polygon 24 from the screen 28 is illustrated by the polygon area 24c and results in a still greater area of the texture 35 being located within the pixel 34 (FIG. 3). For each of the depicted situations, a weighted average is computed in accordance with the curve 27 to determine the appropriate gray level for the pixel 34 (FIG. 2) on the screen 28.

Recapitulating, it can be seen that as the polygon 24 moves away from the eyepoint O, the texture tends to be modulated and more of it is embraced. At more remote locations, the variation in a ratio of the light area L and the dark area D with relative lateral movement of the pixel tends to drop. Also, as an image moves away from a viewer, the detail is perceived less sharply. Stated conversely, details of an object become fuzzy as the object is moved further away from the viewer. Relating the phenomenon to FIG. 4, the border between the area La and the area Da of the pixel area 24a would be substantially sharper than the distinctions between the areas Lc and Dc within the pixel 24c.

As recognized in the past, the consequence of the reduced criticality is that several pyramidal texture maps may be used to map a texturing function with minimal antialiasing artifacts and reduced computation. For example, as the polygon 24 (FIG. 2) moves away from the screen 28, progressively cruder determinations may be made with respect to the texture 35 because the pattern becomes progressively more fuzzy. See the above-referenced article, "Pyramidal Parametrics".

As implemented in the prior art, representative values for the weighted average values indicated by the curve 27 (FIG. 3) are computed and stored for various depth displacements of the polygon 24. Consequently, as the displacement increases with respect to the screen 28, the averaging may be treated progressively more crudely. Relating the progression to FIG. 3, less accurate computation is appropriate with increased displacement in the z dimension.

The change may be appreciated by considering lateral movement of the polygon area 24a (FIG. 4) with respect to the pixel 34. If the area 24a moves laterally with respect to the pixel 34, it may be seen that the ratio between the light and dark areas La and Da will change substantially. Conversely, if the polygon area 24c moves laterally with respect to the pixel 34, the ratio between the sum of the light areas Lc and the sum of the dark areas Dc does not substantially change.

Thus, depending on the amount of texture 35 encompassed by the pixel 34, the weighted average calculation becomes less critical. In that regard, as disclosed in detail below, different look-up tables may be selected on the basis of differential values computed for determining the weighted averages.

As treated in depth below, the calculation or selection of a specific table of weighted averages involves using computed differentials in the texture coordinates as related to pixel displacement, i.e. du and dv as related to x and y displacement. The operation is cooperatively involved with the interpolation of the polygon 24 in a space without nonlinear distortion.

To operate in space not involving nonlinear distortion, interpolating the polygon 24 in world space may involve the use of barycentric coordinates. Barycentric coordinates are basically treated in a paper entitled, "Representation and Approximation of Surfaces", by Robert E. Barnhill, appearing in *Mathematical Software III*, published in 1977 by Academic Press, Inc. Some essential explanation of barycentric coordinates as utilized herein will now be given.

Figure 5:
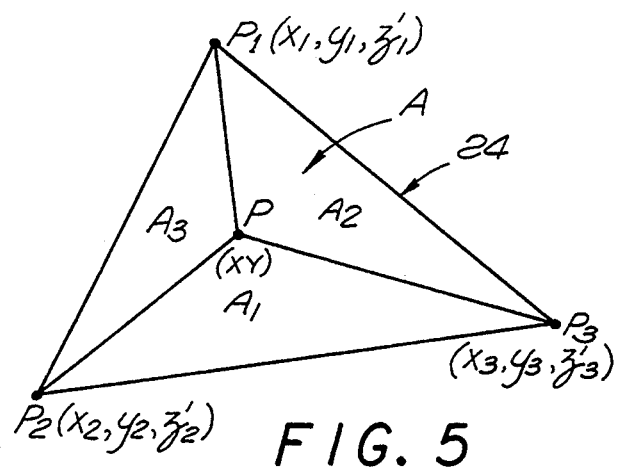
FIG. 5 is a graphic representation illustrating barycentric coordinates with respect to a polygon as developed herein.

FIG. 5 shows the triangular polygon 24 enlarged and in a plane view. Assume that the points $P_1$, $P_2$ and $P_3$ are defined in a world-space three-dimensional coordinate system, e.g. as illustrated in terms:

$P_1(x_1,y_1,z'_1)$; $P_2(x_2,y_2,z'_2)$ and $P_3(x_3,y_3,z'_3)$

Note that, as described above with reference to FIG. 2, the point P lies in the plane of the polygon. Recognize that the point P may be defined in terms of the points $P_1$, $P_2$ and $P_3$ using the equation, $P = b_1P_1 + b_2P_2 + b_3P_3$, where $b_1$, $b_2$ and $b_3$ are called the barycentric coordinates of the point P. Note that the point P is defined by a unique set of barycentric coordinates and further that the coordinates $b_1 + b_2 + b_3 = 1$. The equation indicates that by applying the barycentric coordinates, the point P can be calculated as a linear combination of the points $P_1$, $P_2$ and $P_3$. For example, if $b_1 = 1$, $b_2 = 0$ and $b_3 = 0$, the defined point lies at the vertex $P_1$. As another simple example, if: $b_1 = \frac{1}{3}$, $b_2 = \frac{1}{3}$ and $b_3 = \frac{1}{3}$, the point P lies in the center of the triangular polygon 24.

To further treat barycentric coordinates, as illustrated in FIG. 5, the triangle $P_1P_2P_3$ (polygon 24) defines the total area A, $A_1$ is the area of triangle $PP_2P_3$, $A_2$ is the area of triangle $PP_3P_1$, and $A_3$ is the area of triangle $PP_1P_2$. Methods are disclosed below for utilizing these areas to compute barycentric coordinates in a space that is not subject to nonlinear distortion and accordingly accomplish improved shading, texturing or so on in accordance with the present invention.

The barycentric coordinates for the triangle $P_1P_2P_3$ can be calculated as:

$$b_1 = A_1/A$$
$$b_2 = A_2/A$$
$$b_3 = A_3/A \qquad \text{Equations (1)}$$

As disclosed in the above-referenced Barnhill paper, since it is obvious by inspection of FIG. 5 that:

$$A = A_1 + A_2 + A_3,$$

the barycentric coordinates in screen space may be expressed as:

$$b_1 = A_1/(A_1 + A_2 + A_3)$$
$$b_2 = A_2/(A_1 + A_2 + A_3)$$
$$b_3 = A_3/(A_1 + A_2 + A_3) \qquad \text{Equations (2)}$$

Figure 7:
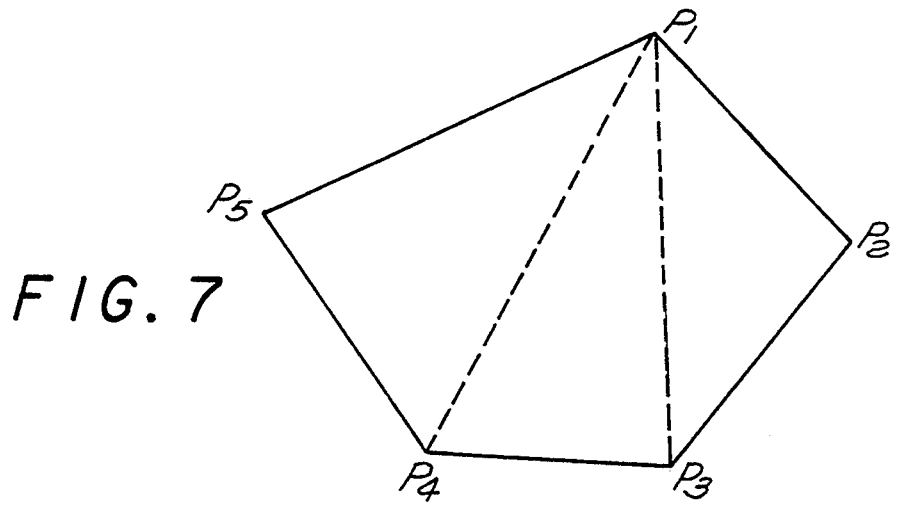
FIG. 7 is a graphic representation illustrating a pentagonal polygon containing triangular polygons as discussed herein.

Applying the above equations, it is noteworthy that although FIG. 5 shows the point P to be centrally located within the triangle $P_1P_2P_3$ (polygon 24), the barycentric equations are relevant if the point P lies anywhere in the plane of the triangle, even if the point P lies outside the triangle. Thus, a determination of the point P in barycentric coordinates to enable interpolation is general and may be applied to nontriangular polygons as well. For example, consider FIG. 7 which shows a pentagon $P_1P_2P_3P_4P_5$. Any triangle within this pentagon (as illustrated) such as triangle $P_1P_3P_4$, may be used for computation of barycentric coordinates $b_1$, $b_2$ and $b_3$. These barycentric coordinates may then be used to interpolate the entire pentagon. Furthermore, with the ability to locate each of the pixel ray impact points (as the point p in the polygon 24) using barycentric coordinates, the polygon can be shaded or texture mapped.

A method for calculation of the barycentric coordinates of the polygon 24 (FIG. 2) in accordance herewith will now be explained mathematically. The method involves definitions of the points $P_1$, $P_2$ and $P_3$ by the coordinates x, y and z' where the x and y coordinates are defined in screen space and the z' coordinate is defined in eye space. Thus, the convention is adopted herein that variables not bearing a prime mark (') are in screen space while variables in eye space bear a prime mark (').

Again, the points are defined as follows:
$P_1$ is defined by $x_1$, $y_1$ and $z'_1$
$P_2$ is defined by $x_2$, $y_2$ and $z'_2$
$P_3$ is defined by $x_3$, $y_3$ and $z'_3$ Treating the areas $A_1$, $A_2$ and $A_3$ as three distinct triangles as illustrated in FIG. 5, it may be seen that the following equations are applicable based on traditional equations for determining the area of triangles:

$$A_2 = \tfrac{1}{2}[PP_1 \times PP_3] = \tfrac{1}{2}[(y_3-y)(x_1-x) - (y_1-y)(x_3-x)] = \tfrac{1}{2}c_2$$

$$A_3 = \tfrac{1}{2}[PP_2 \times PP_1] = \tfrac{1}{2}[(y_1-y)(x_2-x) - (y_2-y)(x_1-x)] = \tfrac{1}{2}c_3$$

$$A_1 = \tfrac{1}{2}[PP_3 \times PP_2] = \tfrac{1}{2}[(y_2-y)(x_3-x) - (y_3-y)(x_2-x)] = \tfrac{1}{2}c_1 \qquad \text{Equations (3)}$$

As will be explained shortly, further equations may now be written in terms of eye space as designated by prime marks, as follows:

$$b'_1 = \frac{c_1 z'_3 z'_2}{c_1 z'_3 z'_2 + c_3 z'_2 z'_1 + c_2 z'_1 z'_3} \qquad \text{Equations (4)}$$

$$b'_2 = \frac{c_2 z'_1 z'_3}{c_1 z'_3 z'_2 + c_3 z'_2 z'_1 + c_2 z'_1 z'_3}$$

$$b'_3 = \frac{c_3 z'_2 z'_1}{c_1 z'_3 z'_2 + c_3 z'_2 z'_1 + c_2 z'_1 z'_3}$$

Recapitulating, the cross-products $c_1$, $c_2$ and $c_3$ can be computed using Equations (3). Then the computed cross-products $c_1$, $c_2$ and $c_3$ may be used to compute the barycentric coordinates $b_1$, $b_2$ and $b_3$ using Equations (2). Once the barycentric coordinates are known, they may be used to interpolate the shade or texture of a polygon as described herein:by specifying locations of ray impact, e.g. point P.

Beginning with the x,y coordinates of a pixel, it is a straightforward matter to arrive at an interpolant for the polygon at that pixel by application of the Equations (3) and (2). Accordingly, an economical method is provided; however, it has a significant drawback. Specifically, the barycentric coordinates created by the method of Equations (2) must be applied to shading or texturing interpolations in screen space and, as indicated above, screen space is the wrong space in which to perform such interpolation because screen space is subject to nonlinear distortion.

In accordance herewith it has been discovered as a practical matter that interpolations may be performed in space that is not subject to nonlinear distortion. In that regard, the Equations (4) show the computation of barycentric coordinates $b'_1$, $b'_2$ and $b'_3$ from the cross-products computed using the Equations (3). These barycentric coordinates in eye space are suitable for application to shading and texturing interpolation in a space not subject to nonlinear distortion. Thus, the application of Equations (3) and (4) enables computation of correct barycentric coordinates for effective use as described above.

It is noteworthy that Equations (4) may not be readily apparent and, accordingly, their development is treated in detail below. The proof is offered merely to establish one operating basis for processing electrical signals to accomplish improved displays utilizing barycentric coordinates. That is, Equations (4) may be utilized to accomplish digitally representative signals for three barycentric coordinates $b'_1$, $b'_2$ and $b'_3$ as for utilization in shading, texturing and so on with regard to videographic images. The equations may be developed as follows.

Figure 6:
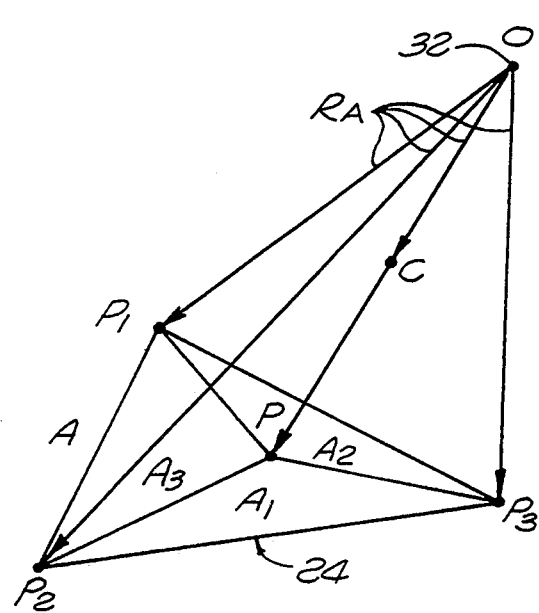
FIG. 6 is a graphic representation illustrating vectors for the computation of barycentric coordinates for a polygon in accordance with the present invention.

Assume a triangle $P_1P_2P_3$ and a pixel P as shown in FIG. 6. The pixel P and the vertices may be used to form three triangles $PP_1P_3$, $PP_3P_2$ and $PP_2P_1$ as illustrated above. The areas of the three triangles are easily calculated using cross-products as shown in Equations (3).

Note that the cross-products are calculated in the x,y plane and require only a simple amount of computation. The barycentric coordinates are then given by Equations (2) which may be restated and supplemented as follows:

$$b_1 = \frac{A_1}{A_1 + A_2 + A_3} = \frac{c_1}{c_1 + c_2 + c_3}$$

$$b_2 = \frac{A_2}{A_1 + A_2 + A_3} = \frac{c_2}{c_1 + c_2 + c_3}$$

$$b_3 = \frac{A_3}{A_1 + A_2 + A_3} = \frac{c_3}{c_1 + c_2 + c_3}$$

where $c_i$ (generic) represents a cross-product.

Let the point P in screen space be defined using barycentric coordinates as:

$$P = b_1P_1 + b_3P_3 + b_2P_2$$

and let the corresponding point P' in eye space be defined using barycentric coordinates:

$$P' = b'_1P'_1 + b'_3P'_3 + b'_2P'_2$$

Again, where the prime mark designates eye space. Now, the perspective transform may be represented as:

$$z = e + (f/z')$$

where e and f are constants derived from the z-depth of the hither and yon clipping planes as well known. Now the transformation contemplated involves getting from $b_1b_2b_3$ (screen space) to $b'_1b'_2b'_3$ (eye space). We can rewrite the above equations for the z-component only as:

$$z = b_1z_1 + b_3z_3 + b_2z_2$$

$$z' = b'_1z'_1 + b'_3z'_3 + b'_2z'_2$$

Substitution of equations gives:

$$e + (f/z') = b_1[e + (f/z'_1)] + b_3[e + (f/z'_3)] + b_2[e + (f/z'_2)]$$

Some rearrangement gives:

$$e + (f/z') = fb_1/z'_1 + fb_3/z'_3 + fb_2/z'_2 + e(b_1 + b_3 + b_2)$$

And, since $b_1 + b_3 + b_2 = 1$, $$f/z' = fb_1/z'_1 + fb_3/z'_3 + fb_2/z'_2$$

$$1/z' = b_1/z'_1 + b_3/z'_3 + b_2/z'_2$$

Multiplication by $z'_1z'_3z'_2$ gives:

$$(z'_1z'_3z'_2)/z' = b_1z'_3z'_2 + b_3z'_1z'_2 + b_2z'_1z'_3$$

Further rearrangement results in:

$$z' = \frac{z'_1z'_3z'_2}{b_1z'_3z'_2 + b_3z'_1z'_2 + b_2z'_1z'_3}$$

Equating two of the above equations in the value of z' yields:

$$b'_1z'_1 + b'_3z'_3 + b'_2z'_2 = \frac{z'_1z'_3z'_2}{b_1z'_3z'_2 + b_3z'_1z'_2 + b_2z'_1z'_3}$$

Now, we need to eliminate one of the barycentric coordinates. The term $b_2$ is chosen and is eliminated by substituting: $b_2 = 1 - b_1 - b_3$, $b'_2 = 1 - b'_1 - b'_3$. Substituting gives:

$$b'_1z'_1 + b'_3z'_3 + (1 - b'_1 - b'_3)z'_2 =$$

$$\frac{z'_1z'_3z'_2}{b_1z'_3z'_2 + b_3z'_1z'_2 + (1 - b_1 - b_3)z'_1z'_3}$$

A series of rearrangements occurs as follows:

$$b'_1(z'_1 - z'_2) + b'_3(z'_3 - z'_2) + z'_2 = \frac{z'_1z'_3z'_2}{b_1(z'_3z'_2 - z'_1z'_3) + b_3(z'_1z'_2 - z'_1z'_3) + z'_1z'_3}$$

$$b'_1(z'_1 - z'_2) + b'_3(z'_3 - z'_2) = \frac{z'_1z'_3z'_2}{b_1z'_3(z'_2 - z'_1) + b_3z'_1(z'_2 - z'_3) + z'_1z'_3} - z'_2$$

$$b'_1(z'_1 - z'_2) + b'_3(z'_3 - z'_2) = \frac{z'_1z'_3z'_2 - b_1z'_3z'_2(z'_2 - z'_1) - b_3z'_1z'_2(z'_2 - z'_3) - z'_1z'_3z'_2}{b_1z'_3(z'_2 - z'_1) + b_3z'_1(z'_2 - z'_3) + z'_1z'_3}$$

$$b'_1(z'_2 - z'_1) + b'_3(z'_2 - z'_3) = \frac{b_1z'_3z'_2(z'_2 - z'_1) + b_3z'_1z'_2(z'_2 - z'_3)}{z'_1z'_3 + b_1z'_3(z'_2 - z'_1) + b_3z'_1(z'_2 - z'_3)}$$

$$= \frac{b_1z'_3z'_2(z'_2 - z'_1)}{z'_1z'_3 + b_1z'_3(z'_2 - z'_1) + b_3z'_1(z'_2 - z'_3)} + \frac{b_3z'_1z'_2(z'_2 - z'_3)}{z'_1z'_3 + b_1z'_3(z'_2 - z'_1) + b_3z'_1(z'_2 - z'_3)}$$

The above equation is interesting because the first term on each side of the equation contains $(z'_2 - z'_1)$ and the second term on each side of the equation contains $(z'_2 - z'_3)$. It may, therefore, be assumed that the equation is separable, i.e.:

$$b'_1(z'_2 - z'_1) = \frac{b_1 z'_3 z'_2 (z'_2 - z'_1)}{z'_1 z'_3 + b_1 z'_3 (z'_2 - z'_1) + b_3 z'_1 (z'_2 - z'_3)}$$

$$b'_3(z'_2 - z'_3) = \frac{b_3 z'_1 z'_2 (z'_2 - z'_3)}{z'_1 z'_3 + b_1 z'_3 (z'_2 - z'_1) + b_3 z'_1 (z'_2 - z'_3)}$$

Simplifying the above, separated equations through division by $(z'_2-z'_1)$ and $(z'_2-z'_3)$ respectively gives:

$$b'_1 = \frac{b_1 z'_3 z'_2}{z'_1 z'_3 + b_1 z'_3 (z'_2 - z'_1) + b_3 z'_1 (z'_2 - z'_3)}$$

$$b'_3 = \frac{b_3 z'_1 z'_2}{z'_1 z'_3 + b_1 z'_3 (z'_2 - z'_1) + b_3 z'_1 (z'_2 - z'_3)}$$

The last two equations are the desired result, because they give $b'_1$ and $b'_3$ in terms of $b_1$ and $b_3$. However, further simplification is possible in terms of the cross-products $c_1$, $c_2$ and $c_3$ defined above. Specifically:

$$b_1 = \frac{c_1}{c_1 + c_3 + c_2} \quad b_3 = \frac{c_3}{c_1 + c_3 + c_2}$$

Substituting these definitions into the equations for $b'_1$ and $b'_3$ gives:

$$b'_1 = \frac{c_1 z'_3 z'_2}{(c_1 + c_3 + c_2) z'_1 z'_3 + c_1 z'_3 (z'_2 - z'_1) + c_3 z'_1 (z'_2 - z'_3)}$$

$$b'_3 = \frac{c_3 z'_1 z'_2}{(c_1 + c_3 + c_2) z'_1 z'_3 + c_1 z'_3 (z'_2 - z'_1) + c_3 z'_1 (z'_2 - z'_3)}$$

The denominator of both expressions can be simplified as follows:

$$(c_1 + c_3 + c_2)z'_1 z'_3 + c_1 z'_3 (z'_2 - z'_1) + c_3 z'_1 (z'_2 - z'_3) = c_1 z'_1 z'_3 + c_3 z'_1 z'_3 + c_2 z'_1 z'_3 + c_1 z'_3 z'_2 - c_1 z'_1 z'_3 + c_3 z'_1 z'_2 - c_3 z'_1 z'_3$$
$$= c_1 z'_3 z'_2 + c_3 z'_1 z'_2 + c_2 z'_1 z'_3$$

The final result, including calculation of $b'_2 = 1 - b'_1 - b'_3$, is the remarkably simple set of equations:

$$b'_1 = \frac{c_1 z'_3 z'_2}{c_1 z'_3 z'_2 + c_3 z'_1 z'_2 + c_2 z'_1 z'_3} \quad \text{Equations (5)}$$

$$b'_3 = \frac{c_3 z'_1 z'_2}{c_1 z'_3 z'_2 + c_3 z'_1 z'_2 + c_2 z'_1 z'_3}$$

$$b'_2 = \frac{c_2 z'_1 z'_3}{c_1 z'_3 z'_2 + c_3 z'_1 z'_2 + c_2 z'_1 z'_3}$$

So the barycentric coordinates in eye space are defined in terms of cross-products calculated in screen space (or screen space, if useful) multiplied by the z-components of the triangle vertices in eye space. The barycentric coordinates thus calculated may be used to interpolate either in eye space or in world space.

It is noteworthy that the quantities $z'_1 z'_2$, $z'_1 z'_3$ and $z'_3 z'_2$ are constant for a particular polygon. Thus, these quantities may be computed and stored only once per polygon per image. Thereafter, to accomplish interpolation at a particular pixel, the cross-products $c_1$, $c_2$ and $c_3$ must be calculated, then combined with $z'_1 z'_2$, $z'_1 z'_3$ and $z'_3 z'_2$ as indicated in Equations (4) to produce $b'_1$, $b'_2$ and $b'_3$.

Once the barycentric coordinates $b'_1$, $b'_2$ and $b'_3$ are calculated in terms of $c_1$, $c_2$ and $c_3$, they may be used for interpolation and accordingly for smooth shading.

Phong shading can be accomplished using three components of the surface normal vector that are interpolated for each pixel in accordance with the Phong shading technique. Texture mapping can be accomplished in space that is not subject to nonlinear distortion using differentials as indicated above. Specifically, assume the existence of a texture x,y coordinate associated with each of the points $P_1$, $P_2$ and $P_3$. These three texture x,y-coordinates may be designated by the vectors $(tx_1, tx_2, tx_3)$ and $(ty_1, ty_2, ty_3)$. The texture x,y coordinates tx and ty at the point P then may be interpolated linearly as:

$$tx = b'_1 tx_1 + b'_2 tx_2 + b'_3 tx_3$$

$$ty = b'_1 ty_1 + b'_2 ty_2 + b'_3 ty_3$$

Figure 8:
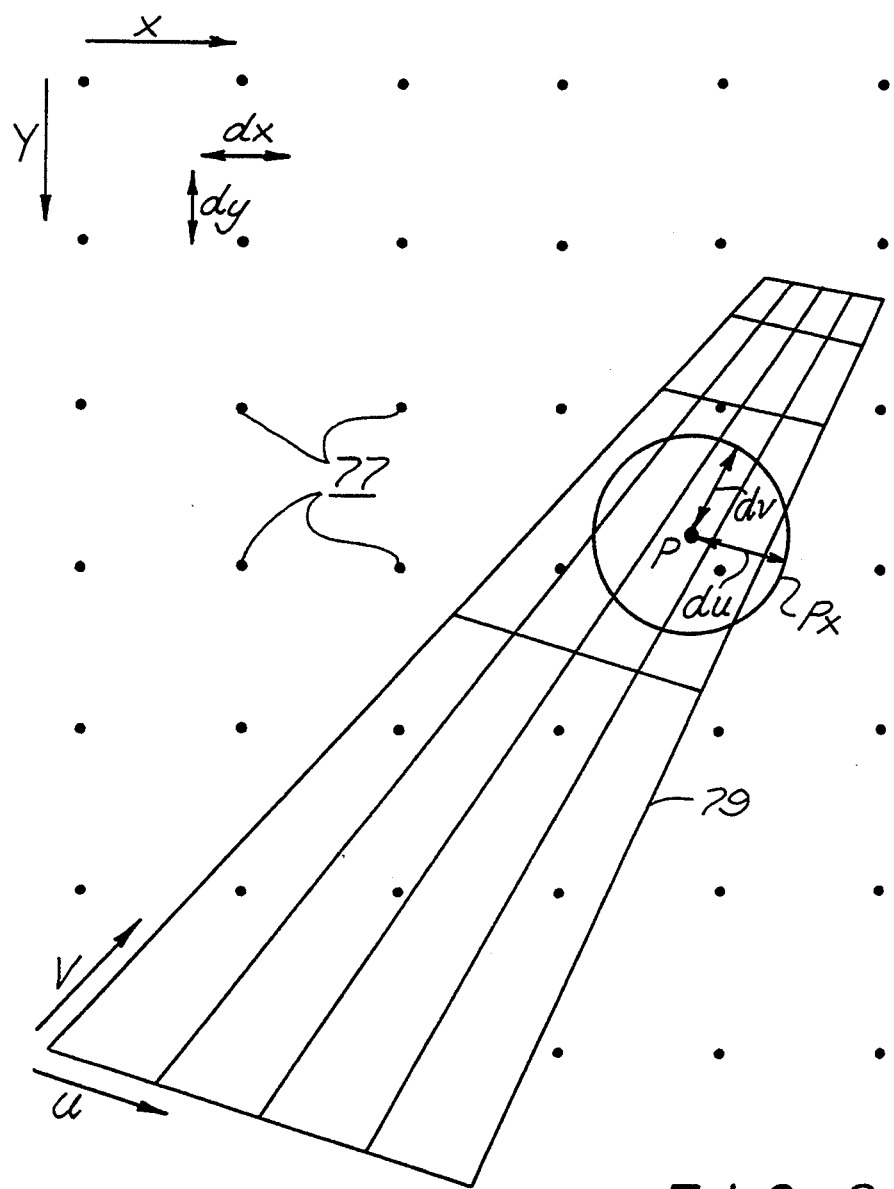
FIG. 8 is a graphic representation of a pixel area of a polygon illustrated in different space coordinates.

While the texture coordinates tx and ty at the point P may be defined as above, as suggested above, it has been somewhat common practice to use the letters u and v to indicate texture coordinates. Specifically, see the above-referenced publication, "Pyramidal Parametrics" regarding the texture parameters u and v. The uses of these parameters in the context of the present invention will now be considered with reference to FIG. 8.

A circular pixel Px is represented about a point P both with respect to x,y coordinates (dots 77) and u,v coordinates (texture grid 79). Specifically, the x and y coordinates are indicated by the dots 77 in a rectangular array aligned with the FIG. 8. The u and v coordinates are defined by the angularly offset texture grid 79. The x,y coordinates specify screen space while the u,v coordinates specify texture space. Actually, the grid 79 can be thought of as texture locked on a polygon that is being interpolated. Clearly, the coordinates x and y are not parallel to the coordinates u and v.

In accordance herewith, the location of the point P is determined in screen space (x and y) based on the location of the pixel center C (see FIG. 2) in screen space. With the point P so determined, the texture on the pixel Px is interpolated with respect to texture coordinates u and v in world space on the basis of du and dv as illustrated. The pixel is then displayed in screen space.

Each of several texels (texture elements) lying within the pixel 34 (FIG. 2) are determined as related to the texture 35. The representative texels can then be filtered in the form of a weighted average as indicated by the curve 27 (FIG. 4).

To consider an example, a pixel might embrace one hundred texels each of which will define a specific texture value depending on the interpolative values of u and v. From the collection of texel values within a pixel, the weighted average can be determined to indicate a texture contribution to the pixel.

As explained above, rather than to repeatedly calculate the averages for each pixel, it has been proposed to provide a look-up table or map addressed by the texture coordinates u and v to provide weighted average values that have been computed for the contribution from a textured polygon to each pixel. To consider a memory organization for accomplishing such operation and incorporating the aspect of progressively increased fuzziness as explained above, reference will now be made to FIG. 9. A related prior form of memory organization is disclosed in the above-referenced *Computer Graphics* article, "Pyramidal Parametrics"; however, the addressing operations are quite distinct from the present technique.

Figure 9:
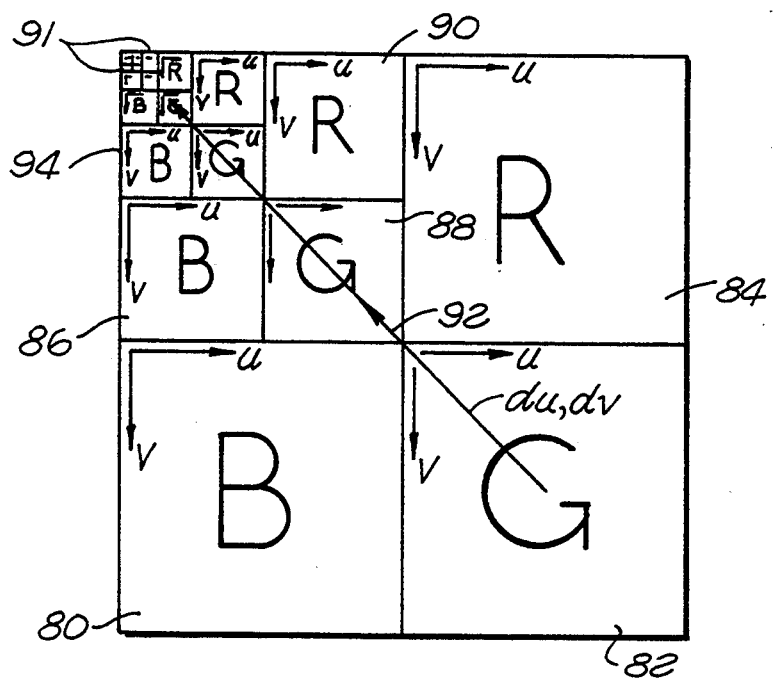
FIG. 9 is a graphic representation of a memory organization as disclosed herein.

Typically, an image is provided in its color components red, green and blue. For example, for a pixel in a textured polygon, precomputed texel averages may be addressed for each color component by the coordinates u and v (FIG. 9). Each of the color components are provided in look-up tables of varying degrees of specificity.

Referring to FIG. 9, at the most detailed level, computed texel averages of blue are stored in the section 80. Similarly, values for the green component are stored in section 82 and values for the red component are stored in the section 84. For example, addressable in the parameters u and v, texel values of the blue component for all of the pixels in the polygon 24 may be identified in the section 80. The same is true with respect to the color components green and red, respectively, and the memory sections 82 and 84. At this point, note that the memory sections 80, 82 and 84 might be employed in the course of treating the pixel 34 (FIGS. 2 and 3). Accordingly, considerable fine detail is available.

The fourth quadrant of memory, as represented in FIG. 9, is arranged to include three smaller sections 86, 88 and 90. The reduced size of the sections 86, 88 and 90 (B, G, R, respectively) indicates a four-to-one reduction in the detail. That is, addressing the memory sections 86, 88 and 90 by the parameters u and v produces pixel value representations that are only one-fourth as fine or precise as those of the sections 80, 82 and 84. The reducing pattern continues in a similar quadrant by quadrant division until, ultimately, sections 91 are provided indicating simply a single shade of red, green or blue.

At this point, note the diagonal composite coordinate (du, dv) indicated by a line 92 that traverses progressively into the smaller memory sections. The line 92 indicates progressive use of smaller (less exacting) memory sections in accordance with a parameter relating to the current detail of the texture 35 (FIG. 2) as related to the viewer. Specifically, in accordance herewith, the parameters are du and dv. The operation is treated in detail below.

Recapitulating, in the operation of the present system, a select set of memory sections (B, G, R) is employed to provide the averaged texel values for a pixel. Generally, as indicated above, in situations as illustrated in FIGS. 3 and 4 where a pixel 34 encompasses a small portion of the texture 35 at area 24a to view the pattern in large detail, the memory sections 80, 82 and 84 would be employed. In such a situation, note that relative motion between the pixel 34 and the texture 35 results in substantial change in the pixel content. Consequently, if the pixel were represented as a binary choice, either entirely light or entirely dark, oscillating movement of the pixel 34 would produce an annoying flicker effect. The weighted averaging avoids such annoyance and also has a substantial antialiasing effect.

Considering the pixel 34 more remotely embracing an area 24b of the texture 35, any displacement of the pixel 34 with respect to the texture 35 still results in a substantial change. However, note that with displacement, compensation begins to occur in relation to the ratio of light and dark areas. In such a situation, the memory sections 86, 88 and 90 might be employed satisfactorily to obtain a weighted average that is slightly less precise.

The area 24c (FIGS. 3 and 4) still more remotely positioned, begins to have a somewhat constant ratio of light and dark areas with relative motion between the pixel 34 and the texture 35. Specifically, as movement occurs, light areas Lc leaving the area along one edge tend to be balanced by light areas Lc entering the pixel from the opposed edge. Accordingly, changes in the weighted average become less severe and smaller memory sections, as from the quadrant 94, might be employed.

Recapitulating, the phenomenon is based on recognizing that textures or patterns on remote objects, for example, tend to become fuzzy and fade to a constant color. Although the proximity of an object or polygon to the viewpoint is one criterion for the change, it is important to recognize that angular changes of the polygon with respect to the viewer also may produce the same effect. Note, however, that in accordance herewith, and as disclosed in detail below, the criteria for selecting three memory sections (R, B, G) in accordance herewith does not involve computations either involving the distance to the polygon 24 or related to its angular position. Rather, the selection involves the differentials of u and v (du and dr) as indicated by the coordinate line 92 (FIG. 9).

Generally, the use of differentials as a criterion for selecting a set of memory sections as depicted in FIG. 9 can be further appreciated by considering FIG. 4. For example, note that as the pixel 34 incrementally moves to the right (x) with respect to the area 24a, there is a substantial change (du) in the pixel texture content. For a significantly different situation, displacement of the pixel 34 to the right with respect to the area 24c produces relatively little change in the ratio between sums of light and dark areas. Specifically, a displacement of one pixel width traverses three checkerboard squares. Consequently the variable, i.e. differential du, is relatively large. The relatively large instantaneous value or differential du indicates the proper use of small B, G, R sections (less detailed) as contained in the quadrant 94 (FIG. 9).

Note that while the above discussion involves the parameter u, similar considerations are applicable for the parameter v, e.g. dv. After selecting the appropriate set of sections (FIG. 9) the parameters u and v are employed to address the selected sections to attain averaged texel values for the pixel. Thus, the system of the present invention enables applications of polygon interpolation using differentials for improved computer graphics displays.

It is important to recognize that, in accordance herewith, the interpolation is accomplished in space not subject to nonlinear distortion, e.g. world or eye space. Thus, considerable improvement in picture quality is facilitated by the combined operations of interpolating in a space that is not subject to nonlinear distortion and utilizing one or more differentials of a variable as the criterion. In that regard, a variety of other significant interpolations may be performed.

Essentially, having established a polygon in a space that is not subject to nonlinear distortion, the texture 35 (FIG. 2) is locked on as well known in the prior art. Consequently, the texture values may be computed for individual texels using differentials in the texture coordinates u and v as those parameters are traditionally identified. Generally, the values of u and v are computed. In that regard, techniques for the computation are well known as recognized in the above-identified article, "Pyramidal Parametrics". Once computed, the values of u and v afford a basis for addressing a select memory section involving different degrees of precision. The selection of the appropriate memory section is accomplished by determining differentials, e.g. du and dv.

To consider the derivation of the differentials du and dv, reference again will be made to FIG. 5 showing the polygon 24 (triangle) defined by: $P_1(x_1, y_1, z'_1)$, $P_2(x_2, y_2, z'_2)$ and $P_3(x_3, y_3, z'_3)$. In each case note that x and y are in screen space while z' is in eye space.

To calculate an area, for example $a_1$:

$$a_1 = \tfrac{1}{2} c_1 \text{ where}$$

$$c_1 = PP_2 \times PP_3 = \begin{vmatrix} x_2 - x & y_2 - y \\ x_3 - x & y_3 - y \end{vmatrix}$$

Note that the vertical bars denote a determinant.

$$\begin{aligned} c_1 &= (x_2 - x)(y_3 - y) - (x_3 - x)(y_2 - y) \\ &= x_2 y_3 - x_2 y - x y_3 + xy - x_3 y_2 + x_3 y + x y_2 - xy \\ &= (y_2 - y_3)x + (x_3 - x_2)y + (x_2 y_3 - x_3 y_2) \\ &= \alpha_1 x + \beta_1 y + \gamma_1 \end{aligned}$$

where, $\alpha_1 = y_2 - y_3$, $\beta_1 = x_3 - x_2$ and $\gamma_1 = x_2 y_3 - x_3 y_2$ So, $c_1$ is a function of x and y.

$$c_1 = g_1(x,y) = \alpha_1 x + \beta_1 y + \gamma_1$$

Similarly, $a_2 = \tfrac{1}{2} C_2$ where $$\begin{aligned} c_2 &= PP_3 \times PP_1 \\ &= (y_3 - y_1)x + (x_1 - x_3)y + (x_3 y_1 - x_1 y_3) \\ &= \alpha_2 x + \beta_2 y + \gamma_2 \end{aligned}$$

where, $\alpha_2 = y_3 - y_1$, $\beta_2 = x_1 - x_3$ and $\gamma_2 = x_3 y_1 - z_1 y_3$
$c_2 = g_2(x,y)$ again a function of x and y.

And, $a_3 = \tfrac{1}{2} c_3$ where $$\begin{aligned} c_3 &= PP_1 \times PP_2 \\ &= (y_1 - y_2)x + (x_2 - x_1)y + (x_1 y_2 - x_2 y_1) \\ &= \alpha_3 x + \beta_3 y + \gamma_3 \end{aligned}$$

where, $\alpha_3 = y_1 - y_2$, $\beta_3 = x_2 - x_1$ and $\gamma_3 = x_1 y_2 - x_2 y_1$
$c_3 = g_3(x,y)$ again a function of x and y.

So, the cross products $c_1$, $c_2$ and $c_3$ are functions of x and y as indicated above. Recalling Equations (5):

$$b'_1 = \frac{c_1 z'_2 z'_3}{c_1 z'_2 z'_3 + c_2 z'_1 z'_3 + c_3 z'_1 z'_2}$$

$$b'_2 = \frac{c_2 z'_1 z'_3}{c_1 z'_2 z'_3 + c_2 z'_1 z'_3 + c_3 z'_1 z'_2}$$

$$b'_3 = \frac{c_3 z'_1 z'_2}{c_1 z'_2 z'_3 + c_2 z'_1 z'_3 + c_3 z'_1 z'_2}$$

The interpolated values of the texture coordinates u and v may be written:

$$\begin{aligned} u &= u_1 b'_1 + u_2 b'_2 + u_3 b'_3 \\ &= \frac{u_1 c_1 z'_2 z'_3 + u_2 c_2 z'_1 z'_3 + u_3 c_3 z'_1 z'_2}{c_1 z'_2 z'_3 + c_2 z'_1 z'_3 + c_3 z'_1 z'_2} \\ &= f_u(c_1, c_2, c_3) \end{aligned}$$

and, $$\begin{aligned} v &= v_1 b'_1 + v_2 b'_2 + v_3 b'_3 \\ &= \frac{v_1 c_1 z'_2 z'_3 + v_2 c_2 z'_1 z'_3 + v_3 c_3 z'_1 z'_2}{c_1 z'_2 z'_3 + c_2 z'_1 z'_3 + c_3 z'_1 z'_2} \\ &= f_v(c_1, c_2, c_3) \end{aligned}$$

So u and v are functions of $c_1$, $c_2$ and $c_3$ where $u_1$, $u_2$, $u_3$, $v_1$, $v_2$, $v_3$, $z'_1$, $z'_2$ and $z'_3$ are taken to be constants for a particular polygon. So, since:

$$u = f_u(c_1, c_2, c_3)$$

$$v = f_v(c_1, c_2, c_3)$$

and $$c_1 = g_1(x,y)$$

$$c_2 = g_2(x,y)$$

$$c_3 = g_3(x,y)$$

we can write the total differential for u as:

$$du = \left[ \left(\frac{\partial u}{\partial c_1}\right)_{c_2,c_3} \cdot \left(\frac{\partial c_1}{\partial x}\right)_y + \left(\frac{\partial u}{\partial c_2}\right)_{c_1,c_3} \cdot \left(\frac{\partial c_2}{\partial x}\right)_y + \left(\frac{\partial u}{\partial c_3}\right)_{c_1,c_2} \cdot \left(\frac{\partial c_3}{\partial x}\right)_y \right]_{dx} + \left[ \left(\frac{\partial u}{\partial c_1}\right)_{c_2,c_3} \cdot \left(\frac{\partial c_1}{\partial y}\right)_x + \left(\frac{\partial u}{\partial c_2}\right)_{c_1,c_3} \cdot \left(\frac{\partial c_2}{\partial y}\right)_x + \left(\frac{\partial u}{\partial c_3}\right)_{c_1,c_2} \cdot \left(\frac{\partial c_3}{\partial y}\right)_x \right]_{dy}$$

Similarly, we can write the total differential for v as:

$$dv = \left[ \left(\frac{\partial v}{\partial c_1}\right)_{c_2,c_3} \cdot \left(\frac{\partial c_1}{\partial x}\right)_y + \left(\frac{\partial v}{\partial c_2}\right)_{c_1,c_3} \cdot \left(\frac{\partial c_2}{\partial x}\right)_y + \left(\frac{\partial v}{\partial c_3}\right)_{c_1,c_2} \cdot \left(\frac{\partial c_3}{\partial x}\right)_y \right]_{dx} + \left[ \left(\frac{\partial v}{\partial c_1}\right)_{c_2,c_3} \cdot \left(\frac{\partial c_1}{\partial y}\right)_x + \left(\frac{\partial v}{\partial c_2}\right)_{c_1,c_3} \cdot \left(\frac{\partial c_2}{\partial y}\right)_x + \left(\frac{\partial v}{\partial c_3}\right)_{c_1,c_2} \cdot \left(\frac{\partial c_3}{\partial v}\right)_x \right]_{dy}$$

Next, there is a need to supply formulae for:

$$\left(\frac{\partial u}{\partial c_1}\right)_{c_2,c_3}; \left(\frac{\partial u}{\partial c_2}\right)_{c_1,c_3}; \left(\frac{\partial u}{\partial c_3}\right)_{c_1,c_2}; \left(\frac{\partial v}{\partial c_1}\right)_{c_2,c_3};$$

-continued $\left(\frac{\partial v}{\partial c_2}\right)_{c_1,c_3}; \left(\frac{\partial v}{\partial c_3}\right)_{c_1,c_2}; \left(\frac{\partial c_1}{\partial x}\right)_y; \left(\frac{\partial c_2}{\partial x}\right)_y;$ $\left(\frac{\partial c_3}{\partial x}\right)_y; \left(\frac{\partial c_1}{\partial y}\right)_x; \left(\frac{\partial c_2}{\partial y}\right)_x;$ and $\left(\frac{\partial c_3}{\partial y}\right)_x.$ To derive an equation for $\left(\frac{\partial u}{\partial c_1}\right)_{c_2,c_3}$ we differentiate $f_u(c_1, c_2, c_3)$ with respect to $c_1$:

$\left(\frac{\partial u}{\partial c_1}\right)_{c_2,c_3} = \frac{u_1 z'_2 z'_3}{c_1 z'_2 z'_3 + c_2 z'_1 z'_3 + c_3 z'_1 z'_2} - \frac{(z'_2 z'_3)(u_1 c_1 z'_2 z'_3 + u_2 c_2 z'_1 z'_3 + u_3 c_3 z'_1 z'_2)}{(c_1 z'_2 z'_3 + c_2 z'_1 z'_3 + c_3 z'_1 z'_2)^2}$ $= \frac{u_1 z'_2 z'_3 (c_1 z'_2 z'_3 + c_2 z'_1 z'_3 + c_3 z'_1 z'_2)}{(c_1 z'_2 z'_3 + c_2 z'_1 z'_3 + c_3 z'_1 z'_2)^2} - \frac{z'_2 z'_3 (u_1 c_1 z'_2 z'_3 + u_2 c_2 z'_1 z'_3 + u_3 c_3 z'_1 z'_2)}{(c_1 z'_2 z'_3 + c_2 z'_1 z'_3 + c_3 z'_1 z'_2)^2}$ $= \frac{z'_2 z'_3 [c_2 z'_1 z'_3 (u_1 - u_2) + c_3 z'_1 z'_2 (u_1 - u_3)]}{(c_1 z'_2 z'_3 + c_2 z'_1 z'_3 + c_3 z'_1 z'_2)^2}$ $= \frac{z'_2 z'_3 [c_1 z'_2 z'_3 (u_1 - u_1) + c_2 z'_1 z'_3 (u_1 - u_2) + c_3 z'_1 z'_2 (u_1 - u_3)]}{(c_1 z'_2 z'_3 + c_2 z'_1 z'_3 + c_3 z'_1 z'_2)^2}$ $= \frac{z'_2 z'_3 [u_1 (c_1 z'_2 z'_3 + c_2 z'_1 z'_3 + c_3 z'_1 z'_2)]}{(c_1 z'_2 z'_3 + c_2 z'_1 z'_3 + c_3 z'_1 z'_2)^2} - \frac{z'_2 z'_3 [u_1 c_1 z'_2 z'_3 + u_2 c_2 z'_1 z'_3 + u_3 c_3 z'_1 z'_2]}{(c_1 z'_2 z'_3 + c_2 z'_1 z'_3 + c_3 z'_1 z'_2)^2}$ $\left(\frac{\partial u}{\partial u_1}\right)_{c_2,c_3} = \frac{(u_1 - u) z'_2 z'_3}{c_1 z'_2 z'_3 + c_2 z'_1 z'_3 + c_3 z'_1 z'_2}$ and $\left(\frac{\partial u}{\partial c_2}\right)_{c_1,c_3}; \left(\frac{\partial u}{\partial c_3}\right)_{c_1,c_2}; \left(\frac{\partial v}{\partial c_1}\right)_{c_2,c_3}; \left(\frac{\partial v}{\partial c_2}\right)_{c_1,c_3};$ and $\left(\frac{\partial v}{\partial c_3}\right)_{c_1,c_2}$ are calculated in a similar manner. To calculate $\left(\frac{\partial c_1}{\partial x}\right)_y$ and $\left(\frac{\partial c_1}{\partial y}\right)_x$ recall that:

$c_1 = g_1(x,y) = \alpha_1 x + \beta_1 y + \gamma_1$

Hence:

$\left(\frac{\partial c_1}{\partial x}\right)_y = \alpha_1$ and $\left(\frac{\partial c_1}{\partial y}\right)_x = \beta_1$ Similarly, since $c_2 = g_2(x,y)$ and $c_3 = g_3(x,y)$:

$\left(\frac{\partial c_2}{\partial x}\right)_y = \alpha_2, \left(\frac{\partial c_2}{\partial y}\right)_x = \beta_2$ $\left(\frac{\partial c_3}{\partial x}\right)_y = \alpha_3$ and $\left(\frac{\partial c_3}{\partial y}\right)_x = \beta_3$ So if the substitutions are made in the formulae for the total differentials du and dv, the following equations are obtained where:

$P = dx$ or $dy$ (the pixel size and)

and $S = c_1 z'_2 z'_3 + c_2 z'_1 z'_3 + c_3 z'_1 z'_2$ $du = \frac{P}{S} [(u_1 - u)(\alpha_1 + \beta_1) z'_2 z'_3 +$ $(u_2 - u)(\alpha_2 + \beta_2) z'_1 z'_3 + (u_3 - u)(\alpha_3 + \beta_3) z'_1 z'_2]$ $dv = \frac{P}{S} [(v_1 - v)(\alpha_1 + \beta_1) z'_2 z'_3 +$ $(v_2 - v)(\alpha_2 + \beta_2) z'_1 z'_3 + (v_3 - v)(\alpha_3 + \beta_3) z'_1 z'_2]$ The above differentials du and dv specify the amount of change in texture coordinates u and v when the spacing between pixels is defined by the pixel size. Note that $u_1, u_2, u_3, v_1, v_2, v_3, (\alpha_1 + \beta_1), (\alpha_2 + \beta_2)$ and $(\alpha_3 + \beta_3)$ are constants for a given polygon. Accordingly, they may be precomputed and stored. Then for a particular pixel (specific x and y coordinates) these values may be retrieved and used in computation related to a specific polygon.

Generally, the values u, v and S can be calculated as follows:

$c_1 = f_1(x,y) = \alpha_1 x + \beta_1 y + \gamma_1$ $c_2 = f_2(x,y) = \alpha_2 x + \beta_2 y + \gamma_2$ $c_3 = f_3(x,y) = \alpha_3 x + \beta_3 y + \gamma_3$ $S = c_1 z'_2 z'_3 + c_2 z'_1 z'_3 + c_3 z'_1 z'_2$ $u = f_u(c_1, c_2, c_3)$ $= \frac{u_1 c_1 z'_2 z'_3 + u_2 c_2 z'_1 z'_3 + u_3 c_3 z'_1 z'_2}{S}$ $v = f_v(c_1, c_2, c_3)$ $= \frac{v_1 c_1 z'_2 z'_3 + v_2 c_2 z'_1 z'_3 + v_3 c_3 z'_1 z'_2}{S}$ Thus, u, v and S will have unique values for each pixel and give rise to unique values of du and dv for each pixel. Since coordinates u and v are calculated by interpolation, then used in the calculation of du and dv, the calculation of du and dv may be regarded as an interpolation as well.

In using the computed values of du and dv, for a uniformly compressed map, combination values would normally be based on root-square difference calculations as suggested by the reference article, "Pyramidal Parametrics" (Williams). In utilizing the quantities du and dv, a non-uniformly compressed memory arrangement or map offers some appeal. In that regard, a non-uniformly compressed map will now be considered. A non-uniformly compressed map requires independent calculation of u and v, as provided in the above equations.

Figure 10:
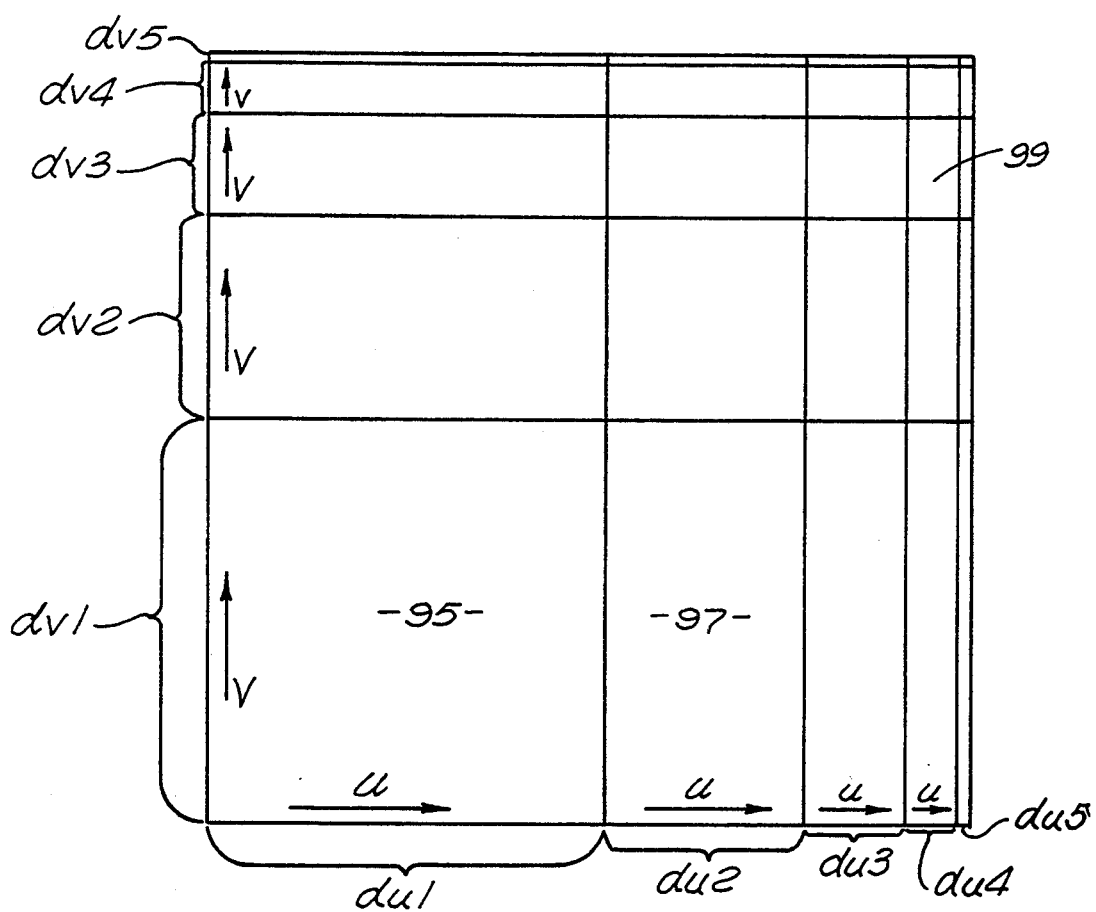
FIG. 10 is a graphic representation of another form of memory organization as used herein.

As illustrated in FIG. 10, a map is sectioned non-linearly both along the abscissa (coordinate u values) and the ordinate (coordinate v values). Accordingly, the most detailed portion of the map is carried in a section 95, somewhat analogous to one of the sections 80, 82 and 84 of the map of FIG. 9. Note that the map as illustrated in FIG. 10 would be duplicated for each of the primary colors red, blue and green.

As increasing values of dv and du indicate the need for less detail (more fuzziness) smaller sections of the map are progressively addressed. However, the map accommodates independent values of du and dv, avoiding the need for a combination calculation. For example, for a value $du_2$ and $dv_1$, the section 97 would be addressed. Picking another example, a value of $dv_3$ and $du_4$ would involve addressing a section 99. In view of these example, it will be apparent that various sections of the map of FIG. 10 are effectively addressed by individual values of dv ($dv_1$–$dv_5$) and individual values of du ($du_1$–$du_5$). As previously explained, addressing sections of the memory or map produces a precalculated weighted average value indicative of the texture 35 (FIG. 2) on a polygon 24, as that texture appears within the pixel 34.

As a final comment in relation to developing an appropriate value for a polygon's texture contribution to a pixel, it is noteworthy that two look-up operations may be performed to accommodate a combination interpolation. An example will explain the operation. Assume an object is located seventy-five meters from an eyepoint. Further assume that look-up tables are provided to accommodate the distances of fifty meters and one hundred meters. To best approximate the desired indication, the two tables (fifty meters and one hundred meters) are addressed and the resultant values are interpolated to approximate a value for seventy-five meters. In the example, the appropriate value would be an average between the two determined values.

Relating the above descriptions to the creation of pictures or images, certain basic considerations are to be stressed. Specifically, it is to be understood that the system of the present invention has application to the creation of images from primitives, e.g. triangular polygons, defined in world space. That is, the system involves the calculation or interpolation of component areas on polygons for display which may, for example, involve texturing. In that regard, after specifying primitive data, a transform is performed in a space that is subject to nonlinear distortion whereby a set of areas are defined. The areas are then defined, sequentially for example, in a space that is not subject to nonlinear distortion, e.g. world space or eye space. In the space not subject to nonlinear distortion, at least one differential is determined that is utilized to interpolate or calculate an aspect of each area in the space that is not subject to nonlinear distortion. Having arrived at calculated or interpolated values, the areas then are displayed in screen space to accomplish an effective image.

Utilization of the system normally involves a process of converting a viewing area to a pixel array (image storage data). The process is generally referred to as "scan conversion" and is well known in the prior art. To some extent, as related to the present invention, the operation is illustrated in FIG. 11 and will now be considered in detail.

The first block 50 (FIG. 11, upper center) indicates "fetch polygon data". Essentially, polygons specified in world space are treated with respect to a defined viewpoint. In practice, polygons may be treated in sequence and in that regard may have been reduced to individual triangles in accordance with well known techniques of the prior art. Also, as indicated above, the hidden surface priorities may be treated independently utilizing well known techniques.

Figure 11:
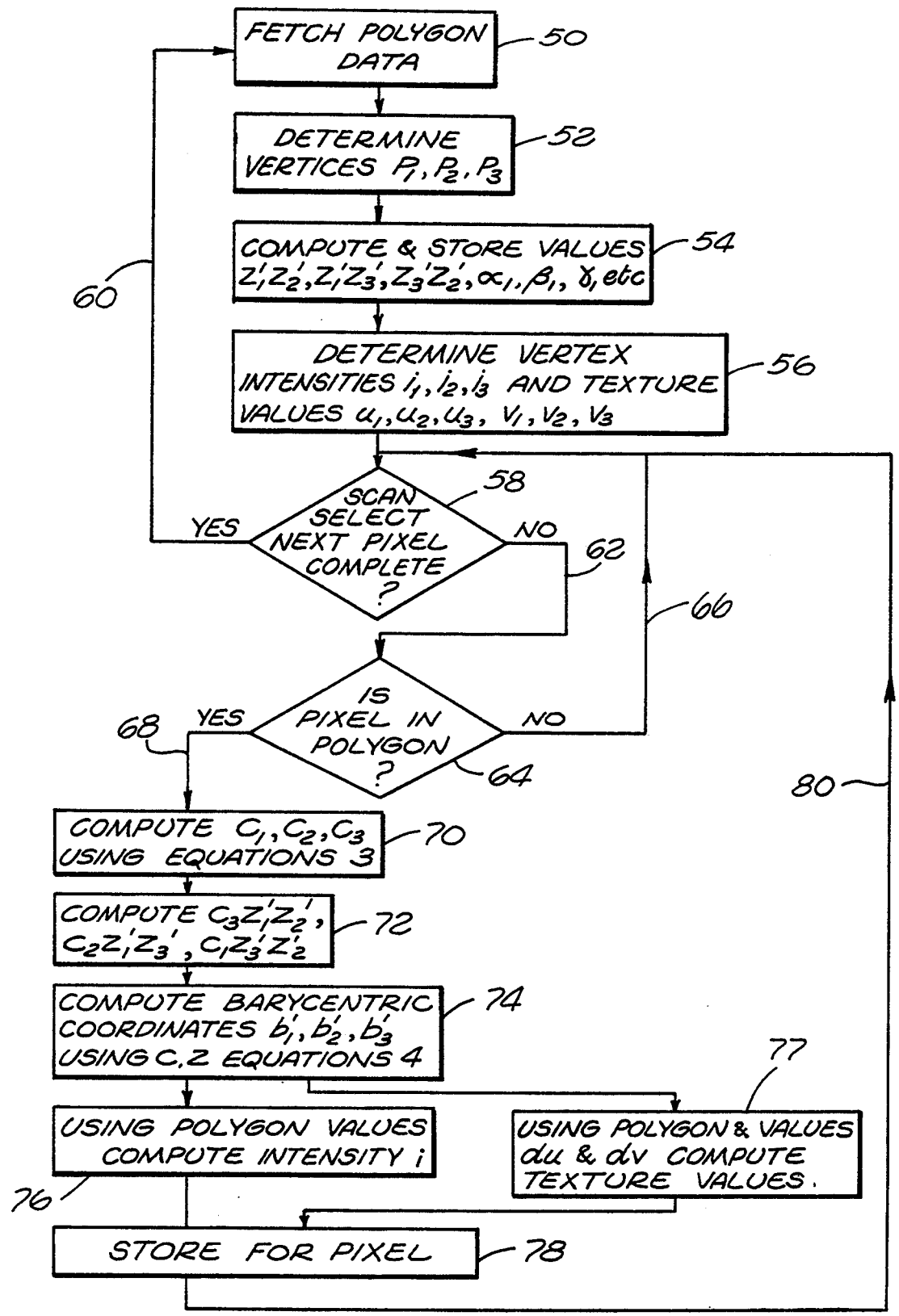
FIG. 11 is a flow diagram illustrating another exemplary process for implementation in accordance with the present invention.

Assuming the polygon under consideration is a triangle (FIG. 2) the vertices $P_1$, $P_2$ and $P_3$ are determined as indicated by a block 52 (FIG. 11). As the next step, values are computed, specifically $z'_1z'_2$, $z'_1z'_3$ and $z'_3z'_2$. These values are stored as indicated by the block 54 along with other values, $\alpha_1$, $\beta_1$, $\gamma_1$, etc.

The block 56 indicates the next step and involves computing the vertex intensities from the polygon data along with the texture coordinates. Specifically, the intensities $i_1$, $i_2$ and $i_3$ are computed as indicated. Furthermore, the texture coordinate values $u_1$, $u_2$ and $u_3$ are computed along with the texture coordinates $v_1$, $v_2$ and $v_3$ for the polygon.

The next step involves a junction depending on whether the scanning of the polygon is complete with the instant pixel. As indicated, a diamond block 58 illustrates the query, "scan select next pixel". In accordance with the well known technique of raster scanning organization, the next pixel is selected and a determination is made as to whether or not the pixel is the last in the current polygon. Specifically in that regard, the scan conversion of solid areas is treated in detail in Chapter 16 of the above-referenced book, *Principles of Interactive Computer Graphics*.

If no further unprocessed pixels remain in the current polygon, the process flows from the block 58 as indicated by the line 60 to the step represented by the block 50, i.e. "fetch polygon data". Alternatively, the process proceeds as indicated by the line 62 to another query block 64, specifically, treating the query: "is the pixel in the polygon?" If not, as indicated by the line 66, the process returns to the block 58 and the scan process seeks the next pixel unless completed.

If the pixel under consideration is in the polygon under consideration (indicated by the line 68) the process proceeds to the step of a block 70 as illustrated. Functionally, the block 70 represents the step of computing the quantities $c_1$, $c_2$ and $c_3$ as by using the Equations (3) as set forth above.

The next step, represented by the block 72, involves another computation. Specifically, in accordance with the above equations there is a computation of values: $c_3z'_1z'_2$, $c_2z'_1z'_3$ and $c_1z'_3z'_2$.

Still another computation in the process is represented by the block 74. Specifically, the block 74 represents the computation of the barycentric coordinates $b'_1$, $b'_2$ and $b'_3$ using the c,z Equations (4).

From the step represented by the block 74, the process proceeds to accomplish separate operating steps as represented by the blocks 76 and 77. Specifically, block 76 represents the computation of intensity i using the quantities $i_1$, $i_2$, $i_3$, $b'_1$, $b'_2$ and $b'_3$. The resulting value is stored for the pixel display, a step that is illustrated by the block 78.

Concurrently with computation of the intensity i, the values of du and dv are computed and used along with the values u and v for obtaining the texture data. Specifically, the values of du and dv can be used to select a section of the map of FIG. 10 then values of u and v are used to address the section as illustrated. Thereafter, the texture data is stored along with the intensity data as indicated by the block 78. Completing the scan conversion provides data for a graphics display as well known in the art.

Figure 12:
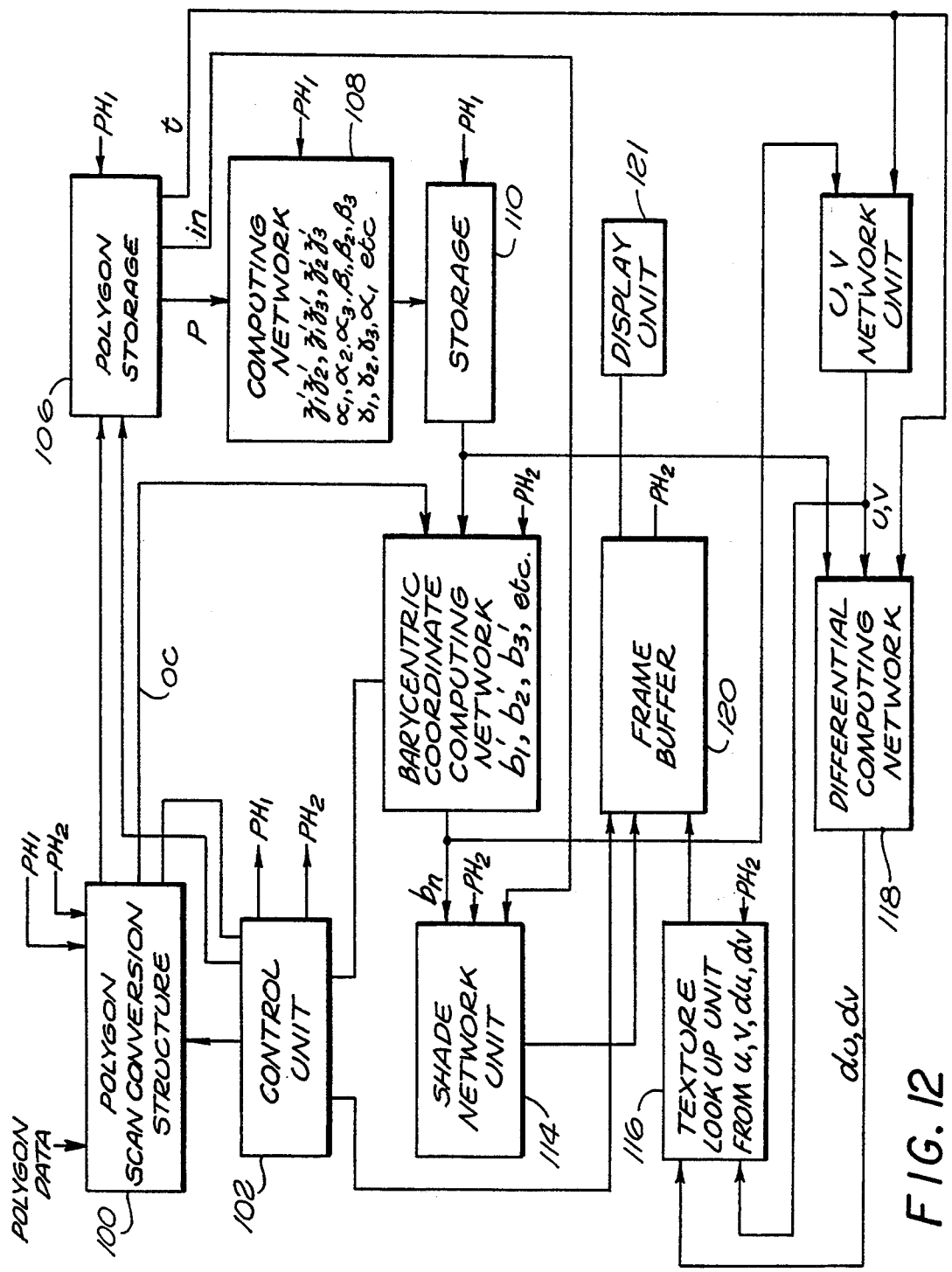
FIG. 12 is a block diagram of a computing structure in accordance with the present invention.

The structure in accordance herewith for computer graphics processing is illustrated in FIG. 12 specifically with regard to texture mapping. As the processes of the computing operations were described in detail above, the following explanation primarily relates to structure implementing the illustrative process.

Referring to FIG. 12, a polygon scan conversion structure 100 (upper left) receives polygon data as from the transformation hardware in a well known display processor (not shown). Essentially, in accordance with the prior art, primitive data (representing polygons) is transformed preparatory to further processing. The further processing may incorporate shading and texture mapping in accordance herewith.

The texturing of individual polygons is executed by the illustrative system in two phases designated phase $PH_1$ and phase $PH_2$. Signals definitive of the two phases $PH_1$ and $PH_2$ are provided by a control unit 102 (left). It is to be appreciated that the control unit 102, along with the polygon scan conversion structure 100, typically would be incorporated in a total computer graphics system of considerable complexity, basic forms of which are well known in the art. However, for purposes of the present invention, the structure of FIG. 12 is illustrated somewhat segregated so as to afford a manageable presentation.

The binary control signals $PH_1$ and $PH_2$ from the control unit 102 sequence the operation of the components as illustrated in the system of FIG. 12. Generally in that regard, an initial phase $PH_1$, defined by the signal also termed $PH_1$, involves the preliminary processing of a fresh polygon. The second phase $PH_2$, defined by the signal $PH_2$, affords the computation of shade and texture values for each individual pixel as each currently processed polygon is scan converted.

The polygon scan conversion structure 100 is coupled to a polygon storage 106 and to a barycentric coordinate computing network 112. The polygon storage 106 is also coupled to a computing network 108 and receives the signal-represented polygon data during the initial phase $PH_1$ and in turn supplies specific components of the data to other operating units during phases $PH_1$ and $PH_2$.

During the second phase $PH_2$, the scan conversion structure 100 supplies signal-represented values pertinent for each individual pixel to the computing network 112. The computing network 112 may take various structural functional forms to compute values for $b'_1$, $b'_2$ and $b'_3$ implementing the operations of the equation explained above. Additionally, intensity signals $i_1$, $i_2$ and $i_3$ are provided from the polygon storage 106 to a shade computer network unit 114. The barycentric coordinates as represented by the signals $b'_1$, $b'_2$ and $b'_3$ from the network 112 are supplied to the shade computing network unit 114. Barycentric coordinates $b'_1$, $b'_2$ and $b'_3$ also are supplied to a u,v network unit 117. Further vertices signals $u_1 u_2 u_3$, $v_1 v_2 v_3$ also are supplied to the unit 117 from the polygon storage 106. Unit 117 computes values of u,v and provides them to a differential computation network 118 and storage 110. The unit 118 computes signal representations of du and dv and provides them to the texture look-up unit 116.

Considering the detailed operation of the system of FIG. 12, the signal-represented polygon data is received in the structure 100 for specific analysis and distribution. In that regard, the structure 100 is actuated by the control unit 102 which sequences the distinct phases and controls the operations to move and develop signals representative of specific data as indicated above.

During the phase $PH_1$, the preliminary data of a polygon is received by the polygon scan conversion structure 100. Subsequently, during the phase $PH_1$, this data is transmitted to the polygon storage 106. Still later in the phase $PH_1$, the polygon storage 106 transmits signal representations for the points $P_1$, $P_2$, and $P_3$ to the computing network 108 which calculates the values: $z'_1 z'_2$, $z'_1 z'_3$, $z'_2 z'_3$, $\alpha_1$, $\alpha_2$, $\alpha_3$, $\beta_1$, $\beta_2$, $\beta_3$, $\gamma_1$, $\gamma_2$, $\gamma_3$, $\alpha_1 z'_2 z'_3$ and so on. Representative signals for the computed values are transmitted from the network 108 to the storage 110.

During the phase $PH_2$, the polygon scan conversion structure 100 determines which pixels lie within the current polygon utilizing scan conversion operations, and provides the screen-space x,y coordinates for each such pixel to be used in shading and texturing computations for that individual pixel in accordance herewith. Specifically, as each pixel lying within the polygon is encountered, unique x and y values are transmitted to the computing networks 112, 117 and 118. Finally, the units 114 and 116 are actuated to determine shade and texture pixel data, respectively.

During the processing for each pixel, the barycentric coordinates $b'_1$, $b'_2$ and $b'_3$ are computed for the pixel and applied to the units 114 and 117. The unit 114 accomplishes the appropriate shade for the pixel by computing representative values for solution of the equation $i = b'_1 i_1 + b'_2 i_2 + b'_3 i_3$. The determined values of i (one for each pixel) are registered in the frame buffer 120 during the interval $PH_2$ in accordance with the particular display format, as well known in the art, to drive a display unit 121. Specifically, the display unit 121 may comprise a raster scan structure as disclosed in Chapter 12 of *Fundamentals of Interactive Computer Graphics* by J. D. Foley and A. Van Dam, published by Addison-Wesley Publishing Company, 1984.

Concurrent with the above operations, the texture mapping operation is performed by the u,v network unit 117 and the differential computing network 118. Specifically, the implemented digital calculation involves the determination of values u and v by the network 117 and executing the equations:

$$u = b'_1 u_1 + b'_2 u_2 + b'_3 u_3$$

$$v = b'_1 v_1 + b'_2 v_2 + b'_3 v_3$$

Then, the differentials (du,dv) are determined by the network 118 by executing the following equations:

$$du = \frac{P}{S}[(u_1 - u)(\alpha_1 + \beta_1)z'_2z'_3 +$$

$$(u_2 - u)(\alpha_2 + \beta_2)z'_1z'_3 + (u_3 - u)(\alpha_3 + \beta_3)z'_1z'_2]$$

$$dv = \frac{P}{S}[(v_1 - v)(\alpha_1 + \beta_1)z'_2z'_3 +$$

$$(v_2 - v)(\alpha_2 + \beta_2)z'_1z'_3 + (v_3 - v)(\alpha_3 + \beta_3)z'_1z'_2]$$

With the values of u, v, du and dv determined in the form of representative signals, MIP MAPS are designated (FIGS. 9 and 10) within the look-up unit 116 to obtain calculated weighted average texture values. The texture values for each pixel are registered in the frame buffer 120 in accordance with the display format of the system.

As explained above, alternative specific processes exist for computing values of the barycentric coordinates $b'_1$, $b'_2$ and $b'_3$ for use in the shade-computing network unit 114 and the texturing unit 116. Of course, the implementation of such variations necessitates changes in the computing networks 108, 112, and 117. Generally, the capability of the network 108 is altered to execute digital computations for the values of $A_1$, $A_2$ and $A_3$ utilizing signal representations from the polygon storage 106 indicative of the quantities specified.

It may be seen that the system of the present invention enables the determination of barycentric coordinates for polygons in order to accomplish such specific operations as smooth shading and texture mapping. Also as indicated above, various other computer graphics operations can be accomplished to afford data signals for computer graphics displays by utilizing such barycentric coordinates. Accordingly, it will be appreciated from the above explanation that the system hereof is susceptible to a large number of modifications and deviations within the basic conceptual network. Accordingly, the scope hereof is deemed to be as set forth in the claims below.

What is claimed is:

1. A process for producing a computer graphics image in accordance with a defined characteristic in screen space based on primitive data defining primitives in space coordinates not subject to nonlinear distortion, said process comprising the steps of:

processing select of said primitive data to provide processed data representing certain specific of said primitives for said graphics image in space coordinates subject to nonlinear distortion;

from said processed data determining pixel image areas of said certain specific primitives for said graphics image, said pixel image areas being represented by pixel image area data;

transforming said pixel image area data to representative area data in said space coordinates not subject to nonlinear distortion;

determining at least one differential value for at least one variable specified in said space coordinates not subject to nonlinear distortion with respect to said primitive data, said differential value for selecting a scale for said defined characteristic from storage;

generating display data using said selected scale for said graphics image based on said representative area data and said differential value; and displaying said graphics images in said space coordinates subject to nonlinear distortion.

2. A process according to claim 1 wherein said space coordinates not subject to nonlinear distortion comprise world space.

3. A process according to claim 1 wherein said space coordinates not subject to nonlinear distortion comprise eye space.

4. A process according to claim 1 wherein said space coordinates subject to nonlinear distortion comprise screen space.

5. A process according to claim 1 wherein said primitive data further includes texture data and wherein said differential value comprises a rate of change in said texture data.

6. A process according to claim 1 wherein said step of processing select of said primitive data includes identifying a primitive in the form of a polygon for display in said space coordinates subject to nonlinear distortion from a viewpoint.

7. A process according to claim 1 wherein said step of determining pixel image areas comprises scan converting of said primitives to specify pixel areas.

8. A process according to claim 1 wherein said step of transforming said pixel image area data to representative area data includes generating values in barycentric coordinates for said certain specific of said primitives.

9. A process according to claim 8 wherein said step of transforming said pixel image area data to representative area data includes determining texture values u and v.

10. A process according to claim 9 wherein said step of determining at least one differential value includes determining texture differential values du and dv.

11. A process according to claim 10 wherein said step of generating display data includes a table of look-up operation indexed by said differential values du and dv.

12. A process according to claim 11 wherein said table look-up operation comprises three table look-ups for three color component images.

13. A process according to claim 10 wherein said step of generating display data includes a table look-up operation indexed by said differential values du and dv and addressed by said values of u and v.

14. A process according to claim 1 wherein said step of transforming said pixel image area data to representative area data includes determining texture values u and v.

15. A process according to claim 1 wherein said step of generating display data includes a table look-up operation indexed by said differential value.

16. A process according to claim 15 wherein said one differential value is instantaneous value of texture value u and another differential value is instantaneous value of texture value v.

17. A component of a computer graphics system for producing dynamic computer graphics images using a display unit based on primitive data defining primitives in space coordinates not subject to nonlinear distortion, said computer graphics system providing processed data representing certain specific of said primitives for said graphics images in space coordinates subject to nonlinear distortion, said component comprising:

scan means for receiving said processed data for determining pixel image areas of said certain specific primitives for said graphics images, said pixel image areas being represented by pixel image area data;

means for transforming said pixel image area data to representative area data in said space coordinates not subject to nonlinear distortion;

means for determining at least one differential value for at least one variable specified in said space coordinates not subject to nonlinear distortion with respect to said primitive data;

means for providing a selected a texture scale in accordance with said differential value;

means for generating display data using said selected texture scale for said graphics images based on said representative area data and said differential value; and means for providing said display data to said display unit.

18. A component according to claim 17 wherein said means for generating display data includes a barycentric coordinate computing network for computing barycentric coordinates for said certain primitives.

19. A component according to claim 18 wherein said means for transforming includes means for determining texture values u and v.

20. A component according to claim 19 wherein said means for determining includes means for determining texture differential values du and dr.

21. A component according to claim 20 wherein said means for generating includes a look-up table indexed by said differential values du and dr.

22. A computer graphics process of displaying a graphics image by interpolating a graphics object as for shading or texturing pixels in accordance with a defined characteristic, comprising the steps of:

mapping, in space coordinates not subject to nonlinear distortion, at least a part of said object as a planar polygon;

selecting vertices of a triangular polygon lying within said planar polygon, said vertices of said triangular polygon designated $P_1$, $P_2$ and $P_3$;

mapping an eyepoint O in relation to said planar polygon;

mapping a perspective plane in relation to said eyepoint and specifying pixel locations in said perspective plane;

generating signal-represented barycentric coordinates for said planar polygon at said vertices, in said space coordinates not subject to nonlinear distortion;

scan converting said planar polygon to identify points P thereof coinciding to said pixels, said points P being in said space coordinates not subject to nonlinear distortion;

interpolating said points P using said barycentric coordinates with respect to said defined characteristic to provide representative signal values;

storing said representative signal values for scan presentation in a display; and driving a scan display structure with said representative signal values for scan presentation of an image.

23. A process according to claim 22 wherein said step of generating signal-represented barycentric coordinates includes the steps of:

mapping areas $A_1$, $A_2$ and $A_3$ of triangles defined by one of said points P and said vertices $P_1$, $P_2$ and $P_3$, as $P_1PP_3$, $P_1PP_2$ and $P_2PP_3$;

specifying depth dimensions of said vertices as $z'_1$, $z'_2$ and $z'_3$ in said space coordinates not subject to nonlinear distortion; and generating barycentric coordinates for said planar polygon as, $$b'_1 = \frac{a_1 z'_3 z'_2}{a_1 z'_3 z'_2 + a_3 z'_2 z'_1 + a_2 z'_1 z'_3}$$

$$b'_2 = \frac{a_2 z'_1 z'_3}{a_1 z'_3 z'_2 + a_3 z'_2 z'_1 + a_2 z'_1 z'_3}$$

$$b'_3 = \frac{a_3 z'_2 z'_1}{a_1 z'_3 z'_2 + a_3 z'_2 z'_1 + a_2 z'_1 z'_3}.$$

24. A process according to claim 22 wherein said interpolating step comprises interpolation of intensity i of said pixels in accordance with said barycentric coordinates.

25. A process according to claim 60 wherein modulation of intensity i is accomplished by a form of the equation, $i = b'_1 i_1 + b'_2 i_2 + b'_3 i_3$ where $i_1$, $i_2$, and $i_3$ specify intensities at said vertices $P_1$, $P_2$, and $P_3$.

26. A process according to claim 22 wherein said interpolating step comprises interpolation of multiple components of surface normal vectors at said points P.

27. A process according to claim 22 wherein said interpolating step comprises interpolation of texture for said pixels.

28. A process according to claim 27 wherein texture coordinates for said vertices are designated as vectors $(tx_1, tx_2, tx_3)$ and $(ty_1, ty_2, ty_3)$ and said texture of said points P is interpolated as:

$$tx = (b'_1, b'_2, b'_3) \cdot (tx_1, tx_2, tx_3)$$

$$ty = (b'_1, b'_2, b'_3) \cdot (ty_1, ty_2, ty_3).$$

29. A computer graphics system for displaying a graphics image by interpolating a graphics object as for shading or texturing pixels in accordance with a defined characteristic, wherein said object is represented in space coordinates not subject to nonlinear distortion, at least in part by a planar polygon with defined vertices $P_1$, $P_2$, $P_3$ and further, wherein an eyepoint O is specified along with a perspective plane, said system comprising:

means for generating signal-represented barycentric coordinates for said planar polygon at said vertices, in said space coordinates not subject to nonlinear distortion;

means for scan converting said planar polygon to identify points P thereof coinciding to said pixels, said points P being in said space coordinates not subject to nonlinear distortion;

means for interpolating said points P using said barycentric coordinates with respect to said defined characteristic to provide representative signal values;

means for storing said representative signal values for scan presentation in a display; and means for receiving said representative signal values from said means for storing to display a representation of said planar polygon as a graphics image.

30. A system according to claim 29 wherein said means for generating signal-represented barycentric coordinates includes, means for mapping areas $A_1$, $A_2$ and $A_3$ of triangles defined by one of said points P and said vertices $P_1$, $P_2$ and $P_3$ as, $P_1PP_3$, $P_1PP_2$ and $P_2PP_3$;

means for specifying depth dimensions of said vertices as $z'_1$, $z'_2$ and $z'_3$ in said space coordinates not subject to linear distortion; and means for generating barycentric coordinates for said planar polygon as, $$b'_1 = \frac{a_1 z'_3 z'_2}{a_1 z'_3 z'_2 + a_3 z'_2 z'_1 + a_2 z'_1 z'_3}$$

$$b'_2 = \frac{a_2 z'_1 z'_3}{a_1 z'_3 z'_2 + a_3 z'_2 z'_1 + a_2 z'_1 z'_3}$$

$$b'_3 = \frac{a_3 z'_2 z'_1}{a_1 z'_3 z'_2 + a_3 z'_2 z'_1 + a_2 z'_1 z'_3}.$$

31. A process according to claim 30 wherein modulation of intensity i is accomplished by a form of the equation, $i = b'_1 i_1 + b'_2 i_2 + b'_3 i_3$ where $i_1$, $i_2$, and $i_3$ specify intensities at said vertices $P_1$, $P_2$, and $P_3$.

32. A process according to claim 30 wherein said texture signals manifest $tx_1, tx_2, tx_3, ty_1, ty_2, ty_3$ and said means for interpolating functions to accomplish the formula, $$tx = (b'_1, b'_2, b'_3) \cdot (tx_1, tx_2, tx_3)$$

$$ty = (b'_1, b'_2, b'_3) \cdot (ty_1, ty_2, ty_3).$$

33. A system according to claim 29 further including means for providing intensity signals and means for interpolation of said intensity signals in accordance with said barycentric coordinates to shade said pixels.

34. A system according to claim 29 wherein said means for interpolating comprises means for providing surface normal signals representative of multiple components of surface normal vectors for said planar polygon and means for interpolation of said surface normal signals in accordance with said signal-represented barycentric coordinates.

35. A system according to claim 29 wherein said means for interpolating includes means for providing texture signals and means for interpolation of said texture signals in accordance with said signal-represented barycentric coordinates.

36. A computer graphics process of displaying a graphics image by interpolating a graphics object as for shading or texturing in accordance with a defined characteristic, comprising the steps of:

mapping, in space coordinates not subject to nonlinear distortion, at least a part of said object as in form of a planar triangular polygon having at least three vertices;

selecting said vertices of said planar triangular polygon, said vertices of said triangular polygon being designated $P_1$, $P_2$ and $P_3$;

mapping an eyepoint O in relation to said planar triangular polygon;

mapping a perspective plane in relation to said eyepoint and specifying pixel locations in said perspective plane;

generating signal-represented barycentric coordinates for said planar triangular polygon at said vertices, in said space coordinates not subject to nonlinear distortion;

scan converting said planar triangular polygon to identify points P thereof coinciding to said pixels, said points P being in said space coordinates not subject to nonlinear distortion;

interpolating said points P using said barycentric coordinates with respect to said defined characteristic to provide representative signal values;

storing said representative signal values for scan presentation; and driving a scan display structure with said representative signal values for scan presentation of an image.

37. A process according to claim 36 wherein said step of generating signal-represented barycentric coordinates includes the steps of:

mapping a first ray extending from said eyepoint to one of said pixels as a vector OC from said eyepoint to said one pixel;

mapping a second, a third and a fourth ray extending from said eyepoint to each of said vertices $P_1$, $P_2$, $P_3$ as vectors $OP_1$, $OP_2$, and $OP_3$ from said eyepoint to said vertices;

formulating digital signal representations for said vectors OC, $OP_1$, $OP_2$ and $OP_3$;

generating triple scalar products using said vectors OC, $OP_1$, $OP_2$ and $OP_3$, defined as $K_1$, $K_2$, $K_3$; and generating barycentric coordinates for said planar triangular polygon as, $$b'_1 = K_1/(K_1 + K_2 + k_3)$$

$$b'_2 = K_2/(K_1 + K_2 + K_3)$$

$$b'_3 = K_3/(K_1 + K_2 + K_3).$$

38. A process according to claim 36 wherein said step of generating signal-represented barycentric coordinates includes the steps of:

mapping areas $A_1$, $A_2$, and $A_3$ of triangles defined by one of said points P and said vertices $P_1$, $P_2$, and $P_3$, as $P_1 P P_3$, $P_1 P P_2$, and $P_2 P P_3$;

specifying depth dimensions of said vertices as $z'_1$, $z'_2$, and $z'_3$ in said space coordinates not subject to nonlinear distortion; and generating barycentric coordinates for said planar triangular polygon as, $$b'_1 = \frac{a_1 z'_3 z'_2}{a_1 z'_3 z'_2 + a_3 z'_2 z'_1 + a_2 z'_1 z'_3}$$

$$b'_2 = \frac{a_2 z'_1 z'_3}{a_1 z'_3 z'_2 + a_3 z'_2 z'_1 + a_2 z'_1 z'_3}$$

$$b'_3 = \frac{a_3 z'_2 z'_1}{a_1 z'_3 z'_2 + a_3 z'_2 z'_1 + a_2 z'_1 z'_3}.$$

39. A process according to claim 38 wherein modulation of intensity i is accomplished by a form of the equation, $i = b'_1 i_1 + b'_2 i_2 + b'_3 i_3$ where $i_1$, $i_2$, and $i_3$ specify intensities at said vertices $P_1$, $P_2$, and $P_3$.

40. A process according to claim 38 wherein said interpolating step comprises interpolation of texture for said pixels.

41. A process according to claim 40 wherein texture coordinates for said vertices are designated as vectors $(tx_1, tx_2, tx_3)$ and $(ty_1, ty_2, ty_3)$ and said texture of said one point is interpolated as:

$$tx = (b'_1, b'_2, b'_3) \cdot (tx_1, tx_2, tx_3)$$

$$ty = (b'_1, b'_2, b'_3) \cdot (ty_1, ty_2, ty_3).$$

42. A process according to claim 36 wherein said interpolating step comprises interpolation of intensity i of said pixels in accordance with said barycentric coordinates.

43. A process according to claim 36 wherein said interpolating step comprises interpolation of multiple components of a surface normal vector at said one point.

44. A computer graphics system for displaying a graphics image by interpolating a graphics object as for shading or texturing pixels in accordance with a defined characteristic, wherein said object is represented in space coordinates not subject to nonlinear distortion, at least in part by a planar polygon with defined vertices $P_1$, $P_2$, $P_3$ and further, wherein an eyepoint O is specified along with a perspective plane, said system comprising:
means for generating signal-represented barycentric coordinates for said planar polygon at said vertices, in said space coordinates not subject to nonlinear distortion;
means for scan converting said polygon to identify points P thereof coinciding to said pixels, said points P being in said space coordinates not subject to nonlinear distortion;
means for interpolating said points P using said barycentric coordinates with respect to said defined characteristic to provide representative signal values;
means for storing said representative signal values for scan presentation; and
means for receiving said representative signal values from said means for storing to display a representation of said planar polygon as a graphics image.

45. A system according to claim 44 wherein said means for generating signal-represented barycentric coordinates includes,
means for generating signal-represented triple scalar products using vectors OC, $OP_1$, $OP_2$, $OP_3$ to provide representations of $K_1$, $K_2$, $K_3$; and
means for generating signal-represented barycentric coordinates $b'_1$, $b'_2$ and $b'_3$ for said planar polygon using a form of the equation, $b'_1 = K_1/(K_1+K_2+K_3)$ $b'_2 = K_2/(K_1+K_2+K_3)$ $b'_3 = k_3/(K_1+K_2+K_3)$.

46. A system according to claim 45 wherein said means for generating multiple products comprises means for generating said multiple products of said vectors by applying equations as a dot product and a cross-product as, $K_1 = OC \cdot [OP_2 \times OP_3]$ $K_2 = OC \cdot [OP_3 \times OP_1]$ $K_3 = OC \cdot [OP_1 \times OP_2]$.

47. A system according to claim 44 wherein said means for generating signal-represented barycentric coordinates includes,
means for mapping areas $A_1$, $A_2$ and $A_3$ of triangles defined by one of said points P and said vertices $P_1$, $P_2$ and $P_3$ as, $P_1PP_3$, $P_1PP_2$ and $P_2PP_3$;
means for specifying depth dimensions of said vertices as $z'_1$, $z'_2$ and $z'_3$ in said space coordinates not subject to nonlinear distortion; and
means for generating barycentric coordinates for said planar polygon as, $$b'_1 = \frac{a_1 z'_3 z'_2}{a_1 z'_3 z'_2 + a_3 z'_2 z'_1 + a_2 z'_1 z'_3}$$

$$b'_2 = \frac{a_2 z'_1 z'_3}{a_1 z'_3 z'_2 + a_3 z'_2 z'_1 + a_2 z'_1 z'_3}$$

$$b'_3 = \frac{a_3 z'_2 z'_1}{a_1 z'_3 z'_2 + a_3 z'_2 z'_1 + a_2 z'_1 z'_3}.$$

48. A system according to claim 47 wherein said means for interpolation accords to a form of the equation, $i = b'_1 i_1 + b'_2 i_2 + b'_3 i_3$ where $i_1$, $i_2$, and $i_3$ specify intensities at said vertices $P_1$, $P_2$, and $P_3$.

49. A process according to claim 47 wherein texture signals manifest $tx_1$, $tx_2$, $tx_3$, $ty_1$, $ty_2$, $ty_3$ and said means for interpolating functions to accomplish the formula, $tx = (b'_1, b'_2, b'_3) \cdot (tx_1, tx_2, tx_3)$ $ty = (b'_1, b'_2, b'_3) \cdot (ty_1, ty_2, ty_3)$.

50. A system according to claim 44 further including means for providing intensity signals and means for interpolation of said intensity signals in accordance with said barycentric coordinates to shade said pixels.

51. A system according to claim 44 wherein said means for interpolation comprises means for providing surface normal signals representative of multiple components of surface normal vectors for said planar polygon and means for interpolation of said surface normals signals in accordance with said signal-represented barycentric coordinates.

52. A system according to claim 44 wherein said means for interpolating includes means for providing texture signals and means for interpolation of said texture signals in accordance with said signal-represented barycentric coordinates.

* * * * *

UNITED STATES PATENT AND TRADEMARK OFFICE
CERTIFICATE OF CORRECTION

PATENT NO. : 5,361,386
DATED : November 1, 1994
INVENTOR(S) : Watkins et al.

It is certified that error appears in the above-indentified patent and that said Letters Patent is hereby corrected as shown below:

In the Abstract:

Line 26, "land" should be --and--.

Column 1, line 31, insert "," after "(primitives)";

Column 1, line 56, delete "-" after "apparatus";

Column 3, line 54, delete "," after "world";

Column 7, line 21, "Z" should be "z";

Column 10, line 45, delete ":" after "herein";

Column 16, line 24, "dr" should be --dv--;

Column 17, line 43, "$x_3y_1-z_1y_3$" should be --$x_3y_1-x_1y_3$--;

UNITED STATES PATENT AND TRADEMARK OFFICE
CERTIFICATE OF CORRECTION

PATENT NO. : 5,361,386
DATED : November 1, 1994
INVENTOR(S) : Watkins et al.

It is certified that error appears in the above-indentified patent and that said Letters Patent is hereby corrected as shown below:

Column 18, line 60, delete $$\left(\frac{\partial y}{\partial c_3}\right)_{c_1, c_2}$$

and substitute therefor $$\left(\frac{\partial v}{\partial c_3}\right)_{c_1, c_2}$$

Column 18, line 60, delete $$\left(\frac{\partial c_3}{\partial v}\right)_x$$

and substitute therefor $$\left(\frac{\partial c_3}{\partial y}\right)_x$$

UNITED STATES PATENT AND TRADEMARK OFFICE
CERTIFICATE OF CORRECTION

PATENT NO. : 5,361,386
DATED : November 1, 1994
INVENTOR(S) : Watkins et al.

It is certified that error appears in the above-indentified patent and that said Letters Patent is hereby corrected as shown below:

Column 19, line 30, delete $$\left(\frac{\partial u}{\partial u_1}\right)_{c_2, c_3}$$

and substitute therefor $$\left(\frac{\partial u}{\partial c_1}\right)_{c_2, c_3}$$

Column 19, line 68, delete "and";

Column 21, line 31, "example" should be --examples--;

IN THE CLAIMS:

Column 27, line 8, delete "a" before "texture";

UNITED STATES PATENT AND TRADEMARK OFFICE
CERTIFICATE OF CORRECTION

PATENT NO. : 5,361,386
DATED : November 1, 1994
INVENTOR(S) : Watkins et al.

It is certified that error appears in the above-indentified patent and that said Letters Patent is hereby corrected as shown below:

Column 27, line 25, "dr" should be --dv--;

Column 27, line 28, "dr" should be --dv--;

Column 28, line 17, "60" should be --24--;

Column 30, line 25, "k$_3$" should be --K$_3$--;

Column 31, line 48, "k$_3$" should be --K$_3$--; and

Column 32, line 47, "normals" should be --normal--.

Signed and Sealed this

Twenty-first Day of February, 1995

BRUCE LEHMAN

*Attest:*

*Attesting Officer*   *Commissioner of Patents and Trademarks*